US009605677B2

(12) United States Patent
Heidecker et al.

(10) Patent No.: US 9,605,677 B2
(45) Date of Patent: Mar. 28, 2017

(54) ANTI-WEAR COATINGS FOR SCROLL COMPRESSOR WEAR SURFACES

(71) Applicant: EMERSON CLIMATE TECHNOLOGIES, INC., Sidney, OH (US)

(72) Inventors: Matthew J. Heidecker, Troy, OH (US); Jean-Luc M. Caillat, Dayton, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 376 days.

(21) Appl. No.: 13/948,458

(22) Filed: Jul. 23, 2013

(65) Prior Publication Data

US 2014/0023540 A1    Jan. 23, 2014

Related U.S. Application Data

(60) Provisional application No. 61/674,663, filed on Jul. 23, 2012.

(51) Int. Cl.
*F16C 17/12* (2006.01)
*F04C 29/02* (2006.01)
(Continued)

(52) U.S. Cl.
CPC .......... F04C 29/02 (2013.01); F04C 15/0003 (2013.01); F04C 18/0215 (2013.01);
(Continued)

(58) Field of Classification Search
CPC .. F04C 2230/91; F04C 2270/16; F04C 29/02; F01D 25/18; F05C 2251/14;
(Continued)

(56) References Cited

U.S. PATENT DOCUMENTS 5,036,880 A    8/1991   Safford et al.
5,064,356 A    11/1991  Horn
(Continued)

FOREIGN PATENT DOCUMENTS

CN    1060699 A    4/1992
CN    1115365 A    1/1996
(Continued)

OTHER PUBLICATIONS

International Preliminary Report on Patentability regarding Application No. PCT/US2013/051678, issued Jan. 27, 2015.
(Continued)

*Primary Examiner* — Alexander Weddle
(74) *Attorney, Agent, or Firm* — Harness, Dickey & Pierce, P.L.C.

(57) ABSTRACT

Anti-wear surface coatings and methods for making them are provided. Such anti-wear surface coatings are particularly suitable for use in a compressor, such as a scroll compressor. A precursor powder material can be applied via spraying to a wear surface of a metal component of the scroll compressor. The precursor powder material comprises a powderized thermoplastic polymer (e.g., PEEK), a first lubricant particle (e.g., molybdenum disulfide ($MoS_2$)) and a second lubricant particle (e.g., polytetrafluoroethylene (PTFE)). Then the applied precursor powder material is heated to form a substantially uniform coating covering the underlying metal component. The substantially uniform coating may have a thickness of less than or equal to about 0.005 inches (about 127 μm).

8 Claims, 11 Drawing Sheets

(51) Int. Cl.
*F04C 15/00* (2006.01)
*F04C 18/02* (2006.01)
*F16C 33/20* (2006.01)
*F01C 17/06* (2006.01)

(52) U.S. Cl.
CPC ........ *F01C 17/066* (2013.01); *F04C 2230/91* (2013.01); *F04C 2240/56* (2013.01); *F04C 2240/605* (2013.01); *F04C 2270/16* (2013.01); *F05C 2251/14* (2013.01); *F05C 2253/12* (2013.01); *F05C 2253/22* (2013.01); *F16C 33/201* (2013.01); *F16C 2208/20* (2013.01); *F16C 2208/58* (2013.01); *F16C 2360/43* (2013.01)

(58) Field of Classification Search
CPC   F05C 2253/12; F16C 2208/20; F16C 33/201; F16C 33/24
USPC ............................................... 427/195, 372.2
See application file for complete search history.

(56) References Cited

U.S. PATENT DOCUMENTS

| | | | |
|---|---|---|---|
| 5,071,329 A | 12/1991 | Sano et al. | |
| 5,076,772 A | 12/1991 | Fraser, Jr. et al. | |
| 5,080,056 A | 1/1992 | Kramer et al. | |
| 5,131,827 A | 7/1992 | Tasaka | |
| 5,229,198 A | 7/1993 | Schroeder | |
| 5,271,679 A | 12/1993 | Yamazumi et al. | |
| 5,320,506 A | 6/1994 | Fogt | |
| 5,482,637 A | 1/1996 | Rao et al. | |
| 5,486,299 A | 1/1996 | Fuwa et al. | |
| RE35,216 E | 4/1996 | Anderson et al. | |
| 5,509,738 A | 4/1996 | Haynes et al. | |
| 5,568,983 A | 10/1996 | Wilson | |
| 5,580,230 A | 12/1996 | Keifer et al. | |
| 5,603,614 A | 2/1997 | Sakata et al. | |
| 5,604,356 A | 2/1997 | Shiraishi | |
| 5,649,816 A | 7/1997 | Wallis et al. | |
| 5,676,035 A | 10/1997 | Chrestoff et al. | |
| 5,683,236 A | 11/1997 | Harrison et al. | |
| 5,823,540 A | 10/1998 | Grabau et al. | |
| 5,836,589 A | 11/1998 | Sakata | |
| 5,842,845 A | 12/1998 | Kawano et al. | |
| 5,844,036 A | 12/1998 | Hughes | |
| 5,879,791 A | 3/1999 | Kato et al. | |
| 5,886,080 A | 3/1999 | Mori | |
| 5,938,419 A | 8/1999 | Honma et al. | |
| 5,947,441 A | 9/1999 | Zenker et al. | |
| 5,962,376 A | 10/1999 | Yamazaki et al. | |
| 5,998,339 A | 12/1999 | Kato et al. | |
| 6,068,931 A | 5/2000 | Adam et al. | |
| 6,116,876 A | 9/2000 | Kitano et al. | |
| 6,126,422 A | 10/2000 | Crum et al. | |
| 6,153,303 A * | 11/2000 | Namura .................. | C08L 27/18 427/385.5 |
| 6,183,137 B1 | 2/2001 | Kojima et al. | |
| 6,267,380 B1 | 7/2001 | Feistel | |
| 6,270,713 B1 | 8/2001 | Crum et al. | |
| 6,305,483 B1 | 10/2001 | Portwood | |
| 6,315,456 B1 | 11/2001 | Tanimoto et al. | |
| 6,332,716 B1 | 12/2001 | Kato et al. | |
| 6,349,943 B1 | 2/2002 | Ishii et al. | |
| 6,378,875 B1 | 4/2002 | Feistel | |
| 6,544,014 B2 | 4/2003 | Kobayashi | |
| 6,575,719 B2 | 6/2003 | Manner et al. | |
| 6,676,296 B2 | 1/2004 | Inoue et al. | |
| 6,695,599 B2 | 2/2004 | Uchida et al. | |
| 6,720,071 B2 | 4/2004 | Ishii | |
| 6,783,338 B2 | 8/2004 | Moroi et al. | |
| 6,814,551 B2 | 11/2004 | Kammhoff et al. | |
| 6,887,052 B1 | 5/2005 | Bush et al. | |
| 6,890,163 B2 | 5/2005 | Uchida et al. | |
| 6,962,059 B2 | 11/2005 | Okaza et al. | |
| 7,011,111 B2 | 3/2006 | Spiegl et al. | |
| 7,056,590 B2 | 6/2006 | Bickle et al. | |
| 7,144,235 B2 | 12/2006 | Yoshimura et al. | |
| 7,214,043 B2 * | 5/2007 | Tsukamoto ............. | F01C 17/04 418/55.3 |
| 7,235,514 B2 | 6/2007 | Mack, Sr. et al. | |
| 7,290,937 B2 | 11/2007 | Takumi et al. | |
| 7,338,265 B2 | 3/2008 | Grassbaugh et al. | |
| 7,351,766 B2 | 4/2008 | Nabeshima et al. | |
| 7,563,510 B2 | 7/2009 | Nogawa et al. | |
| 7,581,734 B1 | 9/2009 | McLeod | |
| 7,658,600 B2 | 2/2010 | Fujita et al. | |
| 7,708,537 B2 | 5/2010 | Bhatia et al. | |
| 7,762,798 B2 | 7/2010 | Ogasawara et al. | |
| 7,824,567 B2 | 11/2010 | Kaneko | |
| 7,942,642 B2 | 5/2011 | Rini et al. | |
| 7,967,584 B2 | 6/2011 | Wang | |
| 8,096,796 B2 | 1/2012 | Ginies et al. | |
| 8,137,577 B2 | 3/2012 | Kaneko et al. | |
| 8,672,646 B2 | 3/2014 | Ishizono et al. | |
| 8,684,711 B2 | 4/2014 | Stover et al. | |
| 9,121,276 B2 | 9/2015 | Heidecker et al. | |
| 2002/0041812 A1 | 4/2002 | Yokomachi et al. | |
| 2002/0158423 A1 | 10/2002 | Barinaga et al. | |
| 2003/0012659 A1 | 1/2003 | Seibel et al. | |
| 2003/0044294 A1 | 3/2003 | Shintoku et al. | |
| 2003/0085532 A1 | 5/2003 | Spiegl et al. | |
| 2003/0138332 A1 | 7/2003 | Osako et al. | |
| 2003/0186060 A1 | 10/2003 | Rao | |
| 2004/0190803 A1 | 9/2004 | Deshpande | |
| 2005/0123428 A1 | 6/2005 | Uchida et al. | |
| 2005/0123758 A1 | 6/2005 | Ghasripoor et al. | |
| 2005/0127610 A1 | 6/2005 | Pratesi et al. | |
| 2005/0189725 A1 | 9/2005 | Edwards | |
| 2005/0208313 A1 | 9/2005 | Bickle et al. | |
| 2006/0102240 A1 | 5/2006 | Spiegl et al. | |
| 2006/0198748 A1 | 9/2006 | Grassbaugh et al. | |
| 2007/0069420 A1 | 3/2007 | Kozyra et al. | |
| 2007/0090606 A1 | 4/2007 | Ross et al. | |
| 2007/0108704 A1 | 5/2007 | Craig et al. | |
| 2007/0163655 A1 * | 7/2007 | Hunter .................... | F16K 3/02 137/375 |
| 2007/0249506 A1 | 10/2007 | Mack et al. | |
| 2007/0292294 A1 | 12/2007 | Fujita et al. | |
| 2008/0247687 A1 * | 10/2008 | Stecher ................... | B05D 5/08 384/7 |
| 2008/0248269 A1 | 10/2008 | Shibuya | |
| 2008/0305270 A1 | 12/2008 | Uhlianuk et al. | |
| 2009/0014678 A1 | 1/2009 | Durham | |
| 2009/0028696 A1 | 1/2009 | Gannett et al. | |
| 2009/0028733 A1 | 1/2009 | Duwel | |
| 2009/0060768 A1 | 3/2009 | Takei | |
| 2009/0129716 A1 | 5/2009 | Oya et al. | |
| 2009/0185935 A1 | 7/2009 | Seibel et al. | |
| 2009/0220725 A1 | 9/2009 | Stefan et al. | |
| 2009/0264581 A1 | 10/2009 | Randis | |
| 2009/0277212 A1 | 11/2009 | Kaneko et al. | |
| 2010/0008805 A1 | 1/2010 | Mohamed et al. | |
| 2010/0038142 A1 | 2/2010 | Snyder et al. | |
| 2010/0086426 A1 | 4/2010 | Ohkawa et al. | |
| 2010/0132381 A1 | 6/2010 | Ross et al. | |
| 2010/0202911 A1 | 8/2010 | Ni et al. | |
| 2010/0212311 A1 | 8/2010 | McQuary et al. | |
| 2010/0226805 A1 | 9/2010 | Kulmer | |
| 2010/0239198 A1 | 9/2010 | Iwata | |
| 2010/0252772 A1 | 10/2010 | Kaneko | |
| 2010/0284844 A1 | 11/2010 | Yamaji et al. | |
| 2010/0290726 A1 | 11/2010 | Schlipf et al. | |
| 2011/0081264 A1 | 4/2011 | Ishizono et al. | |
| 2011/0136712 A1 | 6/2011 | Kaneko | |
| 2011/0212290 A1 | 9/2011 | Crawley et al. | |

(56) References Cited

U.S. PATENT DOCUMENTS

| | | | |
|---|---|---|---|
| 2012/0100029 A1 | 4/2012 | Ikeda et al. | |
| 2013/0302518 A1 | 11/2013 | Asami et al. | |
| 2014/0024563 A1 | 1/2014 | Heidecker | |

FOREIGN PATENT DOCUMENTS

| | | | |
|---|---|---|---|
| CN | 1616266 | A | 5/2005 |
| CN | 101126417 | A | 2/2008 |
| CN | 101544080 | A | 9/2009 |
| CN | 104662199 | A | 5/2015 |
| CN | 104662300 | A | 5/2015 |
| EP | 1698784 | A1 | 9/2006 |
| EP | 1785627 | A1 | 5/2007 |
| EP | 2402606 | A1 | 1/2012 |
| EP | 2875169 | A1 | 5/2015 |
| GB | 2136439 | A | 9/1984 |
| GB | 2232679 | A | 12/1990 |
| GB | 2313632 | A | 12/1997 |
| JP | S63-297457 | A | 12/1988 |
| KR | 20060096377 | A | 9/2006 |
| WO | 2012/041259 | A1 | 4/2012 |
| WO | WO-2012096067 | A1 | 7/2012 |
| WO | 2014/018505 | A1 | 1/2014 |
| WO | 2014/018530 | A1 | 1/2014 |

OTHER PUBLICATIONS

Suwa, Takeshi, et al., "Effect of Molecular Weight on the Crystalline Structure of Polytetrafluoroetylene As-Polymerized," Journal of Polymer Science: Polymer Phsics Ed., vol. 13, pp. 2183-2194 (1975).

Lancaster, J.K., "Accelerated wear testing of PTFE composite bearing materials," Tribology International, vol. 12, No. 2, pp. 65-75 (Apr. 1979).

GLS Corporation, "Overmolding Guide," 2004, pp. 2,8.

International Search Report regarding Application No. PCT/US2013/051628, mailed Oct. 16, 2013.

Written Opinion of International Searching Authority regarding Application No. PCT/US2013/051628, mailed Oct. 16, 2013.

International Preliminary Report on Patentability regarding Application No. PCT/US2013/051628, issued Jan. 27, 2015.

Search Report regarding European Patent Application No. 13822105.6-1608 / 2875169, dated Mar. 7, 2016.

Non-Final Office Action regarding U.S. Appl. No. 13/948,226, dated Oct. 2, 2014.

Final Office Action regarding U.S. Appl. No. 13/948,226, dated Feb. 25, 2015.

Non-Final Office Action regarding U.S. Appl. No. 13/948,653, dated Oct. 8, 2015.

Restriction Requirement regarding U.S. Appl. No. 13/948,653, dated May 27, 2015.

International Search Report regarding Application No. PCT/US2013/051678, mailed Oct. 21, 2013.

Written Opinion of the International Searching Authority regarding Application No. PCT/US2013/051678, mailed Oct. 21, 2013.

Office Action regarding U.S. Appl. No. 13/948,653, dated Mar. 30, 2016.

Office Action regarding Chinese Patent Application No. 201380049154.3, dated Mar. 8, 2016. Translation provided by Unitalen Attorneys at Law.

Ying Zhu. "Refrigeration Air Conditioning Equipment." Chapter III, Section VII Shaft Seal. Jun. 2002. Translation provided by Unitalen Attorneys at Law.

Advisory Action regarding U.S. Appl. No. 13/948,653, dated Jun. 10, 2016.

Office Action regarding U.S. Appl. No. 13/948,653, dated Jun. 29, 2016.

Office Action and Search Report regarding Chinese Patent Application No. 201380049133 dated Mar. 28, 2016. Translation provided by Unitalen Attorneys at Law.

* cited by examiner

Fig-1 -- Prior Art --

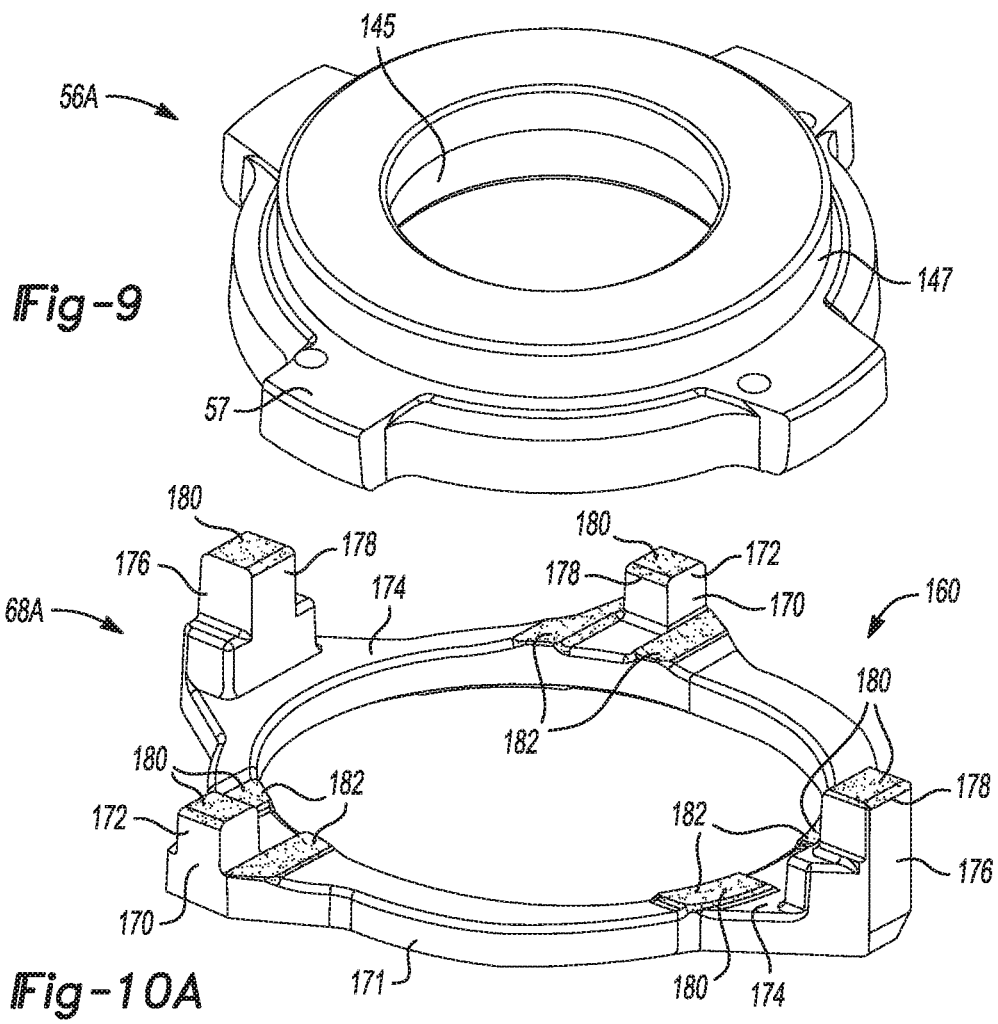
*Fig-9*
*Fig-10A*
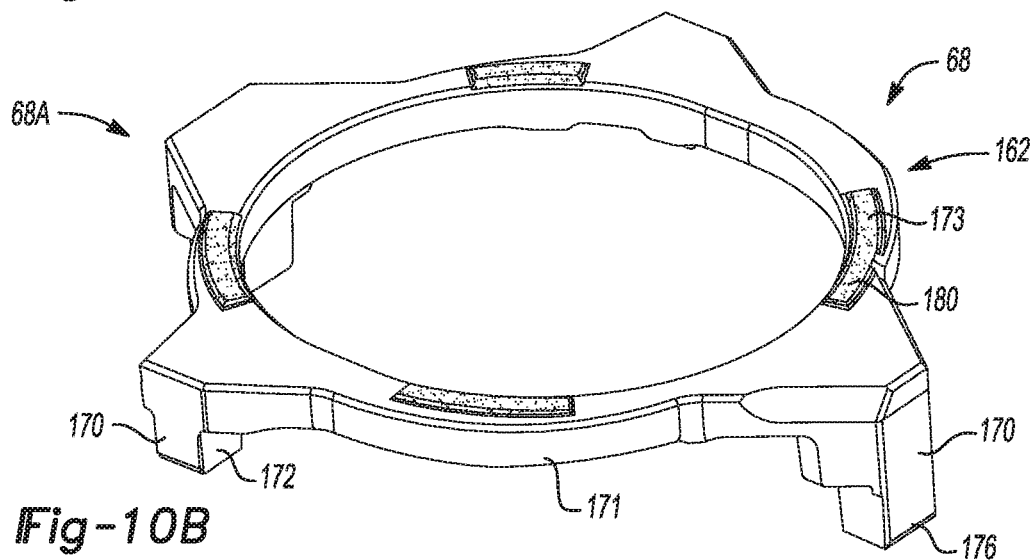
*Fig-10B*

US 9,605,677 B2

ANTI-WEAR COATINGS FOR SCROLL COMPRESSOR WEAR SURFACES

CROSS-REFERENCE TO RELATED APPLICATIONS

This application claims the benefit of U.S. Provisional Application No. 61/674,663, filed on Jul. 23, 2012. The entire disclosure of the above application is incorporated herein by reference.

FIELD

The present disclosure relates to wear surfaces of compressor components having improved anti-wear coatings, and more specifically, the present disclosure pertains to methods of making such anti-wear coatings from sprayable polymer-based materials for wear surfaces of scroll compressor components.

BACKGROUND

This section provides background information related to the present disclosure which is not necessarily prior art.

Bearings generally serve the purpose of reducing friction at interfacing wear surfaces, while supporting radial and axial loads. In compressors, as well as in other equipment, a cylindrical sleeve-type bearing is commonly used and typically includes an outer metal sleeve or backer having a porous metal layer adjacent to the sleeve with a polymer disposed therein to form the wear surface. For example, a common bearing used as a journal bearing in compressors has a steel sleeve/backer with a porous bronze layer having a well-dispersed PTFE resin, and also having lead particles dispersed in the resin (e.g., through use of a solvent based slurry). Global mandates to provide lead-free bearings necessitated development of alternative lead-free designs that provide equivalent and/or improved efficiency to conventional bearings, like sleeve-type bearings.

SUMMARY

This section provides a general summary of the disclosure, and is not a comprehensive disclosure of its full scope or all of its features.

In various aspects, the present disclosure provides methods of making an anti-wear surface coating and to the anti-wear coatings themselves. Thus, in one aspect, the present disclosure pertains to a method of making an anti-wear surface coating for a scroll compressor. The method optionally comprises applying a precursor powder material to a wear surface of a metal component of the scroll compressor. The precursor powder material comprises a powderized thermoplastic polymer, a first lubricant particle, and a second distinct lubricant particle. The method may also comprise heating the applied precursor powder material on the wear surface to at or above a crystalline melt temperature of a crystalline thermoplastic polymer, or at or above a glass-liquid transition temperature of an amorphous thermoplastic polymer, to facilitate uniform bonding to the underlying metal component. In certain variations, the substantially uniform coating has a thickness of less than or equal to about 0.005 inches (about 127 µm).

In other aspects, the present disclosure provides a compressor component that comprises a metal and defines one or more wear surfaces. Such a compressor component optionally comprises an anti-wear coating disposed on at least a portion of the metal wear surface of the compressor component. In certain variations, the anti-wear coating has a thickness of less than or equal to about 0.005 inches (about 127 µm). The anti-wear coating comprises a thermoplastic polymer, a first lubricant particle comprising molybdenum disulfide ($MoS_2$) and a second lubricant particle comprising polytetrafluoroethylene (PTFE).

In yet other aspects, the present disclosure pertains to a scroll compressor component formed of a metal and defining a wear surface that comprises an anti-wear coating having a thickness of less than or equal to about 0.005 inches (about 127 µm). In certain variations, the anti-wear coating consists essentially of (i) a thermoplastic polyaryletherketone (PAEK) polymer; and at least one lubricant particle selected from the group consisting of: polytetrafluoroethylene (PTFE), molybdenum disulfide ($MoS_2$), tungsten disulfide ($WS_2$), hexagonal boron nitride, carbon fiber, graphite, graphene, carbon nanotubes, thermoset polyimide, and combinations thereof. In certain preferred variations, the anti-wear coating consists essentially of (i) a polyaryletherketone (PAEK) thermoplastic polymer selected from the group consisting of: a polyetherketone (PEK), polyetheretherketone (PEEK), a polyetheretheretherketone (PEEEK), polyetherketoneketone (PEKK), polyetheretherketoneketone (PEEKK) polyetherketoneetheretherketone (PEKEEK), polyetheretherketonetherketone (PEEKEK) and combinations thereof; (ii) a first lubricant particle and (iii) a second lubricant particle. The first and second lubricant particles are distinct from one another.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The present disclosure will become more fully understood from the detailed description and the accompanying drawings, wherein:

FIG. 9 is a perspective view of a thrust plate component of the main bearing housing shown in FIGS. 8A-8B;

FIG. 10A is a perspective view of an Oldham coupling ring from a first side prepared in accordance with certain principles of the present disclosure;

FIG. 10B is a perspective view from a second side opposite to the first side shown in FIG. 10A prepared in accordance with certain principles of the present disclosure;

Corresponding reference numerals indicate corresponding parts throughout the several views of the drawings.

DETAILED DESCRIPTION

Figure 1:
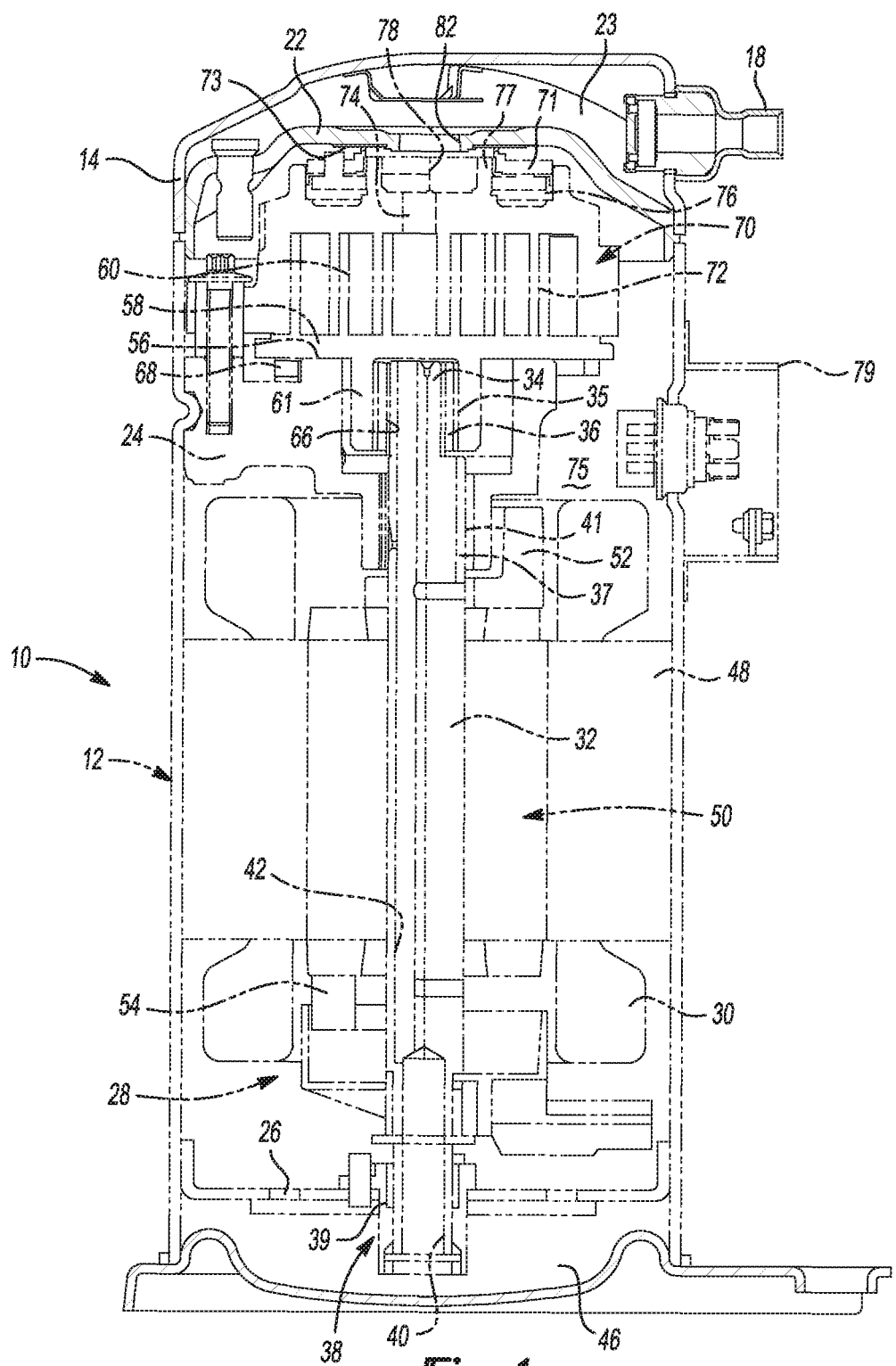
FIG. 1 is a sectional view through a center of a scroll compressor having a conventional design.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element for feature's relationship to another element(s) or feature(s) as illustrated in the Figures. Spatially relative terms may be intended to encompass different orientations of the device in use or operation in addition to the orientation depicted in the Figures. For example, if the device in the Figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided sub-ranges falling within the entire range, including endpoints given for the ranges as well as sub-ranges excluding endpoints.

By way of background, standard pressed sleeve bearings, such as metal-polymer composite materials disposed on a metal backing or sleeve, like the DU® Bearing Material commercially available from Glacier Garlock Bearings are often used as a drive bearing in a compressor (e.g., where a rotating shaft drives a component like an orbiting scroll of a scroll compressor) or as a journal bearing for supporting different locations of the rotating shaft. As discussed above, such a sleeve-type bearing typically includes a cylindrical steel sleeve having a porous metal layer, like a porous sintered bronze material layer, formed along one side of the metal sleeve. A polymer or resin is disposed in the porous sintered bronze layer to form the wear surface. For example, a common bearing is a steel sleeve/backer having a porous bronze layer with a well-dispersed PTFE resin with lead particles dispersed therein. A drive bearing like the DU® bearing material typically has tolerances that are rather wide from a diametrical standpoint. For example, the standard DU® bearing design can have a 0.065 mm (0.002559 in.) diametrical tolerance range, which is determined by the pressing operation and the metal backer associated with the bearing, for example. This large diametrical tolerance can in turn result in greater clearances between the bearing wear surface and the opposing surface(s). A precision machined surface for a drive bearing (such as for a machined lower bearing) is far less at about 0.013 mm from a diametrical standpoint (or approximately 0.0005 in.). Compressor applications in which low speeds and high loads are typically experienced require smaller tolerances that are desirably more similar to the machined bearing surfaces for effective performance. Thus, the ability to tighten the tolerances of bearings and between working/interfacing surfaces is generally advantageous in certain compressor running scenarios, for example, in variable speed compressor operation.

The present technology provides alternative bearings or wear surfaces from those conventionally used, and are particularly advantageous for use in compressors, especially scroll compressors or rotary compressors. For example, in certain variations, the present disclosure provides an anti-wear coating on a wear surface, such as a metal wear surface on a compressor component. Thus, in accordance with certain aspects of the present teachings, a thin polymer composite coating is applied directly onto a wear surface, such as a machined metallic surface and is processed to form an anti-wear coating on the wear surface without additional finish machining. In certain aspects, the inventive anti-wear coatings are anti-friction coatings, as well. In certain variations, the thin polymeric composite coating is a sprayable coating. Such a material coating is robust, has a low coefficient of friction, has greater lubricity and tighter tolerances, and furthermore is capable of meeting stringent environmental regulations, such as the European Community's Registration, Evaluation, Authorisation and Restriction of Chemical substances (REACH) or the United Kingdom's Restriction of the Use of Certain Hazardous Substances in Electrical and Electronic Equipment (RoHS), by way of non-limiting example. The inventive material coatings are capable of withstanding aggressive environments associated with various compressor operating conditions. Furthermore, the ability of the inventive coatings to comply with REACH and RoHS standards makes it particularly suitable for use in global systems production. Furthermore, the present anti-wear coating technology can improve tolerances and can offer performance enhancement compared to many conventionally used metallic friction and wear inducing components in certain compressor applications.

In certain aspects, the present disclosure provides an anti-wear coating disposed on at least a portion of a wear surface. The wear surface can be a metal wear surface, which can optionally be a machined metal surface (e.g., a lower bearing, drive bearing, shaft, or other wear surface). In certain variations, the anti-wear coating comprises a thermoplastic polymer and at least one lubricant particle. In certain preferred variations, the anti-wear coating comprises a thermoplastic polymer, a first lubricant particle, and a second lubricant particle that is distinct from the first particle. One or a plurality of distinct layers of material can be applied to the anti-wear surface to form the anti-wear coating. In certain variations, a thickness of the inventive thin substantially uniform anti-wear coating is less than or equal to about 0.005 inches (about 127 μm). In certain embodiments, the inventive thin substantially uniform anti-wear coating has a thickness of greater than or equal to about 0.002 inches (about 51 μm) to less than or equal to about 0.003 inches (about 76 μm). Such a thin anti-wear coating on a wear surface provides the ability to eliminate traditional bearings (e.g., sleeve-type bearings and/or bushings) or alternatively, can be used with traditional bearings and/or bushings to further improve performance. In certain alternative variations, the anti-wear coating may be used in a conventional sleeve-type bearing or bushing as the wear surface material disposed over a backing sleeve material, for example.

Where multiple layers of anti-wear materials form an anti-wear coating, such layers may be formed of the same compositions or have different compositions. In certain alternative variations, an anti-wear material may comprise one or more pure polymer basecoat layers that can be considered to be a "primer layer" that comprises a first thermoplastic polymer applied to a wear surface. Such basecoat or primer layers are free of any lubricant particles. In such embodiments, a basecoat or primer layer can be built up to a preselected thickness by using a first thermoplastic polymer with no fillers, thus forming a base including one or more pure polymer layers. In certain aspects, one to three layers of such a first thermoplastic polymer can be applied to form pure polymer layers. Notably, the first thermoplastic polymer may actually include a plurality of distinct thermoplastic polymer layers, but for convenience will be referred to as a first thermoplastic polymer. A topcoat formed from an anti-wear coating layer having a second thermoplastic polymer and at least one lubricant particle can be applied over the pure polymer layer(s) to form an anti-wear topcoat for the anti-wear material. In certain variations, such an anti-wear coating layer comprises a second thermoplastic polymer, a first lubricant particle, and a second lubricant particle that is distinct from the first particle. Thus, after the one or more pure polymer layers comprising the first thermoplastic polymer are first formed on the wear surface, then one or more anti-wear coating layers comprising the second thermoplastic polymer and one or more lubricant particles can be applied over the pure polymer layer(s). The first thermoplastic polymer may be the same as or different from the second thermoplastic polymer.

As noted above, in certain alternative variations, an anti-wear coating material according to any of the embodiments of the present teachings may comprise a basecoat, binder, or primer layer between the wear surface and the anti-wear coating layers. In certain variations, an anti-wear material according to any of the embodiments of the present teachings may comprise a basecoat, binder, or primer layer between the wear surface and a basecoat comprising one or more pure polymer layers, which may be over-coated with an anti-wear coating layer(s). In other variations, the anti-wear coating material comprising an anti-wear coating may be applied directly to the wear surface, without application of primers or binders.

Thus, the anti-wear material of the present disclosure is capable of providing one or more of the following benefits: (i) a coated wear surface (having an anti-wear coating disposed on a wear surface); (ii) a lead-free anti-wear composition comprising fillers that are compliant with various environmental regulations, such as REACH and RoHS regulations; (iii) enhanced thermal stability of the bearing surface having the anti-wear coating applied thereto; (iv) improved lubricity in low-oil circulation (oil-starved) operating conditions; and (v) improved dimensional controls over standardized sleeve-type bearing systems, by way of non-limiting example.

In other aspects, the present disclosure provides a method of making an anti-wear surface coating for a wear surface of a metal component, such as a wear surface of a scroll compressor component. The method comprises applying a precursor powder material to a wear surface of a metal component. The precursor powder material optionally comprises a powderized thermoplastic polymer, a first lubricant particle, and a second distinct lubricant particle. Such a powderized precursor material can be dispersed or suspended in a carrier or liquid carrier to be applied to a target surface. By "powderized" it is meant that the dry materials are pulverized or milled to provide a plurality of solid particles having a relatively small size. In certain preferred aspects, the plurality of powder particles has an average particle size diameter of less than or equal to about 50 μm, optionally less than or equal to about 40 μm, optionally less than or equal to about 30 μm, optionally less than or equal to about 25 μm, optionally less than or equal to about 20 μm, optionally less than or equal to about 15 μm, and in certain variations, optionally less than or equal to about 10 μm.

In various aspects, a thermoplastic resin provides a heat-resistant and wear resistant binding matrix for the lubricant particle(s), including for two or more distinct lubricant particles, of various embodiments of the inventive anti-wear coating. In certain alternative embodiments discussed above, such thermoplastic resins may be used to build up a basecoat, as well. As noted above, in certain preferred variations, one or more thermoplastic polymers are provided in a powderized dry form. In accordance with certain aspects of the present teachings, a powderized thermoplastic polymer comprises a thermoplastic polymer. Such a thermoplastic may include polymers from the polyaryletherketone (PAEK) family. In certain variations, the polyaryletherketone (PAEK) thermoplastic polymer can be selected from the group consisting of: a polyetherketone (PEK), polyetheretherketone (PEEK), a polyetheretheretherketone (PEEEK), polyetherketoneketone (PEKK), polyetheretherketoneketone (PEEKK) polyetherketoneetheretherketone (PEKEEK), polyetheretherketonetherketone (PEEKEK), and combinations thereof. In other variations, the thermoplastic matrix material may comprise polyamide imide (PAI), polyphenylene sulfide (PPS), or polyimide (PI) alone or as combined with any of the other suitable thermoplastic polymers discussed just above. In certain variations, the powderized thermoplastic polymer is selected from the group consisting of: a polyaryletherketone (PAEK) or other ultra-performing polymer including, but not limited to poly (phenylene sulphide) (PPS), poly(sulphone) (PS) polyamide imide (PAI), poly(benzimidazole) (PBI), or polyimide (PI). In certain variations, a particularly desirable carrier material or thermoplastic polymer is an ultra-performance, high temperature thermoplastic resin, namely polyethetherketone (PEEK), a member of the polyaryletherketone (PAEK) family, in a powderized form.

The lubricant particle fillers can be any number of friction/wear compounds including, but not limited to inorganic fillers, organic fillers, and polymeric particles used as fillers. A "lubricant particle" includes a solid material in particulate form (e.g., a plurality of solid particles) that contributes to a low coefficient of friction or provides additional tribological or synergistic properties to the overall anti-wear material composition. In various aspects, the anti-wear coating comprises a first lubricant particle and a second lubricant particle that are distinct from one another. In certain variations, the anti-wear coating comprises at least one lubricant particle selected from the group consisting of: polytetrafluoroethylene (PTFE), molybdenum disulfide ($MoS_2$), tungsten disulfide ($WS_2$), hexagonal boron nitride, carbon fiber, graphite, graphene, lanthanum fluoride, carbon nanotubes, polyimide particles (or powderized polyimide polymer), polybenzimidazole (PBI) particles, and combinations thereof. In certain preferred variations, an anti-wear coating comprises a first lubricant particle and a second lubricant particle distinct from the first lubricant particle. The first lubricant particle and the second lubricant particle can be independently selected from the group consisting of: polytetrafluoroethylene (PTFE) particles (or powderized PTFE), molybdenum disulfide ($MoS_2$) particles, tungsten disulfide ($WS_2$) hexagonal boron nitride particles, carbon fibers, graphite particles, graphene particles, lanthanum fluoride, carbon nanotubes, polyimide particles (or powderized polyimide polymer), poly(benzimidazole (PBI) particles (e.g., fibers), and combinations thereof. In certain preferred variations, the first lubricant particle comprises molybdenum disulfide ($MoS_2$) and the second distinct lubricant particle comprises polytetrafluoroethylene (PTFE), such as powderized PTFE particles.

In certain alternative embodiments, the method may comprise applying a first precursor powder material to a wear surface of a metal component. The method optionally comprises applying a first precursor powder material without any lubricant particles, but including a first powderized thermoplastic polymer, to a wear surface of a metal component to form a basecoat (or multiple layers of a basecoat). A second precursor powder material can then be applied over the basecoat, which can optionally be applied in multiple coatings to form a plurality of layers of an anti-wear coating. The second precursor powder material comprises a second powderized thermoplastic polymer, a first lubricant particle, and a second distinct lubricant particle, as discussed in the embodiments above.

In one aspect, the one or more lubricant particles comprise polytetrafluoroethylene (PTFE) and molybdenum disulfide ($MoS_2$), which are selected as the friction/wear compounds to improve wear characteristics of the anti-wear coating material. PTFE can be incorporated at greater than or equal to about 5 to less than or equal to about 30% by weight, with the most preferred amount of PTFE being present at greater than or equal to about 15 to less than or equal to about 20% by weight. In certain aspects, it can be advantageous to avoid excessively high concentrations of PTFE (well in excess of 30% by weight), as PTFE forms a soft phase that can capture debris and create undesirable adhesive wear. $MoS_2$ can be incorporated at greater than or equal to about 2.5 to less than or equal to about 25% by weight, optionally at greater than or equal to about 2.5 to less than or equal to about 15% by weight, with a particularly desirable amount of $MoS_2$ being about 10% by weight. Of course, other anti-wear coatings are likewise contemplated in other embodiments of the present disclosure, as outlined above.

In certain aspects, the powderized thermoplastic may comprise a polyetheretherketone (PEEK) having an average particle size (diameter) of greater than or equal to about 2 µm to less than or equal to about 25 µm, optionally greater than or equal to about 5 µm to less than or equal to about 15 µm, and in certain variations, about 10 µm. Likewise, a first lubricant particle, such as PTFE, may have an average particle size (diameter) of greater than or equal to about 2 µm to less than or equal to about 30 µm, optionally greater than or equal to about 5 µm to less than or equal to about 15 µm, and in certain variations, about 10 µm. A second lubricant particle, such as $MoS_2$, may have an average particle size (diameter) of greater than or equal to about 0.1 µm to less than or equal to about 30 µm, optionally greater than or equal to about 2 µm to less than or equal to about 10 µm, and in certain variations, about 5 µm. In certain cases, tailored chemistry of filler particles is advantageous to promote enhanced interfacial adhesion between the organic or inorganic fillers and the organic matrix. In this case, it is optional to utilize those forms of fillers that may have been encapsulated or reacted with an organic surfactant whose surface has been modified via surfactant addition.

In certain variations, the precursor powder material comprises the powderized thermoplastic polymer at greater than or equal to about 45% to less than or equal to about 92.5% by mass of the total precursor powder material, while the first lubricant particle and the second lubricant particle are collectively present at greater than or equal to about 7.5% to less than or equal to about 45% by mass of the total precursor powder material. In certain aspects, the first lubricant particle is present in the precursor powder material at greater than or equal to about 2.5% to less than or equal to about 25% by mass of the total mass of the precursor powder material. The second lubricant particle is present at greater than or equal to about 5% to less than or equal to about 30% by mass of the total mass of the precursor powder material.

In certain variations, the anti-wear coating consists essentially of (i) a thermoplastic polyaryletherketone (PAEK) polymer; and at least one lubricant particle selected from the group consisting of: polytetrafluoroethylene (PTFE), molybdenum disulfide ($MoS_2$), tungsten disulfide ($WS_2$), hexagonal boron nitride, carbon fiber, graphite, graphene, lanthanum fluoride, carbon nanotubes, polyimide, poly(benzimidazole) (PBI), and combinations thereof. In certain other variations, a suitable precursor powder material or anti-wear coating in accordance with the present teachings consists essentially of a first lubricant particle and a second lubricant particle. The first and second lubricant particles are distinct from one another. In such embodiments, the suitable precursor powder material or anti-wear coating consists essentially of the first lubricant particle at greater than or equal to about 2.5% to less than or equal to about 25% by mass of the precursor powder material or anti-wear coating; the second lubricant particle at greater than or equal to about 5% to less than or equal to about 30% by mass of the precursor powder material or anti-wear coating; and the thermoplastic polymer at greater than or equal to about 45% to less than or equal to about 92.5% by mass of the precursor powder material or anti-wear coating.

In certain variations, the precursor powder material comprises a powderized thermoplastic polymer that comprises polyetheretherketone (PEEK); a first lubricant particle comprising molybdenum disulfide ($MoS_2$), and a second distinct lubricant particle comprising polytetrafluoroethylene (PTFE). Thus, in certain embodiments, the precursor powder material comprises the powderized thermoplastic polymer comprising PEEK at greater than or equal to about 45% to less than or equal to about 92.5% by mass of the total precursor powder material. The first lubricant particle molybdenum sulfide ($MoS_2$) at greater than or equal to about 2.5% to less than or equal to about 25% by mass of the total precursor powder material. The second lubricant particle comprises polytetrafluoroethylene (PTFE) at greater than or equal to about 5% to less than or equal to about 30% by mass of the total precursor powder material.

In certain embodiments, the precursor powder material or anti-wear coating may consist essentially of a thermoplastic polymer. Such a thermoplastic may include polymers from the polyaryletherketone (PAEK) family. In certain variations, the polyaryletherketone (PAEK) thermoplastic polymer can be selected from the group consisting of: a polyetherketone (PEK), polyetheretherketone (PEEK), a polyetheretheretherketone (PEEEK), polyetherketoneketone (PEKK), polyetheretherketoneketone (PEEKK) polyetherketoneetheretherketone (PEKEEK), polyetheretherketoneetherketone (PEEKEK), and combinations thereof. Thus, the precursor powder material or anti-wear coating may consist essentially of a polyetheretherketone (PEEK), a polyaryletherketone (PAEK), a polyetheretheretherketone (PEEEK), and combinations thereof; a first lubricant particle, and a second lubricant particle. In other embodiments, the precursor powder material or anti-wear coating consists essentially of a thermoplastic polymer comprising polyetheretherketone (PEEK); a first lubricant particle and a second distinct lubricant particle.

In one embodiment, a precursor powder material or an anti-wear coating consists essentially of a thermoplastic polymer selected from the group consisting of: a polyetheretherketone (PEEK), a polyaryletherketone (PAEK), a polyetheretheretherketone (PEEEK), a first lubricant particle comprising molybdenum disulfide ($MoS_2$), and a second distinct lubricant particle comprising polytetrafluoroethylene (PTFE). In yet other embodiments, a precursor powder material or an anti-wear coating consists essentially of a thermoplastic polymer comprising polyetheretherketone (PEEK); while the first lubricant particle comprises molybdenum disulfide ($MoS_2$) and the second distinct lubricant particle comprises polytetrafluoroethylene (PTFE).

Thus, a precursor material may comprise (i) a powderized thermoplastic precursor material, (ii) a first lubricant particle and (iii) a second lubricant particle, which are applied to a wear surface of a component. In certain variations, the precursor material further comprises (iv) a solvent, vehicle, or liquid carrier in which the precursor powder material (including the powderized thermoplastic precursor material, the first lubricant, and the second lubricant) is suspended or dispersed. In such variations, the precursor material comprising the powderized thermoplastic material matrix (i), the lubricant(s) (ii and iii), and (iv) the liquid carrier are sprayed for ultimate deposition onto the substrate. In certain variations, the wear surface is a metal wear surface of a scroll component. The liquid carrier provides a viscosity such that the precursor mixture becomes a sprayable fluid (although not a dissolved mixture). Suitable liquid carriers include water or other dispersing media. Thus, liquid carriers may comprise water, ethanol, methanol, hexane, or other suitable combinations thereof. While any conventional solvent may be selected as the liquid carrier, it preferably will not volatilize too rapidly and is non-reactive with any surfactants and powderized precursor powder constituents. Hence, surfactants may optionally be combined with the liquid carrier, for example, water, to improve dispersion of the powderized precursor particles. In certain variations, the precursor material comprising the powderized precursor particles and liquid carrier may have less than or equal to about 50% by weight solids and the balance the liquid carrier.

Furthermore, regions of the component that are not to be coated can be protected by masking and the like, so that the sprayed material is only applied to the exposed regions of the wear surface. In certain variations, the precursor material comprising the powderized thermoplastic precursor material, the first lubricant, and the second lubricant in the liquid carrier is subjected to shear forces and/or agitation prior to spraying for minimizing phase separation during the spraying process. In certain alternative embodiments, a dry powderized precursor material may be applied via electrostatic or electrophoretic deposition or other application techniques known for applying such powderized materials.

After applying the precursor powder material to the wear surface, the method of the present teachings further comprises heating the material to form a substantially uniform coating covering the underlying metal component by taking the base polymer either at or above its crystalline melting temperature (in the case of a crystalline polymer) or alternatively at or above its glass-liquid transition ($T_g$) or softening temperature (in the case of an amorphous polymer) in order to form a tightly fused matrix. The heating generally promotes melting and fusion of the powder material (e.g., especially of the thermoplastic polymer matrix) onto the wear surface to form a substantially uniform coating. By "substantially uniform," it is meant that the coating spreads to form a contiguous or continuous surface coating with a minimum of defects (uncoated regions, pin holes, fractures, and the like). The substantially uniform coating is applied as a thin surface layer. In certain variations, the substantially uniform coating has an average thickness of less than or equal to about 0.005 inches (about 127 μm). In certain embodiments, an average thickness of the substantially uniform coating ranges from greater than or equal to about 0.002 inches (about 51 μm) to less than or equal to about 0.003 inches (about 76 μm).

The heating of precursor powder material disposed on the wear surface in certain aspects facilitates crystalline melting of the powderized thermoplastic resin in the precursor powder material, so that the precursor material forms a contiguous, substantially uniform coating having the first and second lubricant particles dispersed therein. In the case of an amorphous material, the heating to at or above the glass-liquid transition temperature ($T_g$) that facilitates softening and flow to allow for the substantially uniform surface to be formed. When the precursor material comprises a liquid carrier and is sprayed onto the surface, the liquid carrier volatilizes leaving the thermoplastic resin and lubricant particles on the surface of the substrate. In certain aspects, the first and second lubricant particles are dispersed in a relatively uniform concentration throughout the substantially uniform anti-wear coating that is formed on the wear surface. In certain variations, a crystalline melting point of a crystalline thermoplastic polymer in the precursor powder material is greater than or equal to about 700° F. (about 371° C.) to less than or equal to about 775° F. (about 413° C.), so that the heating step involves at least partially melting the precursor powder material to facilitate formation of the substantially uniform coating. In other variations, a glass-liquid transition temperature ($T_g$) or softening temperature of an amorphous crystalline thermoplastic polymer in the precursor powder material is greater than or equal to about 700° F. (about 371° C.) to less than or equal to about 775° F. (about 413° C.), so that the heating step involves at least partially softening the precursor powder material to facilitate formation of the substantially uniform coating.

In certain aspects, the heating can be conducted by a conventional heat source, such as in an industrial heater, furnace, or oven. The heating may be conducted in a heater having a predetermined temperature of greater than or equal to about 700° F. (about 371° C.) to less than or equal to about 775° F. (about 399° C.). However, depending on the composition of the precursor material, other temperatures may be appropriate to facilitate formation of a uniform coating from the powderized starting material. In certain variations, the heating is conducted (e.g., where the heat source is at the predetermined temperature) for a duration of greater than or equal to about 15 minutes to less than or equal to about 45 minutes. The heating may be optionally be conducted for a duration of greater than or equal to about 15 minutes to less than or equal to about 30 minutes, in certain variations. In certain preferred embodiments, the heating may be conducted for about 20 minutes.

Furthermore, the present disclosure contemplates multiple distinct application steps (e.g., distinct spraying steps) for the precursor powder material to achieve a desired thickness and coverage of the coating. Therefore, the methods of the present disclosure also contemplate multiple distinct heating steps after each respective application of the precursor powder material. In certain variations, a precursor material for forming a basecoat may comprise a powderized thermoplastic precursor material without any lubricant particles, which may be applied by spraying in one or more layers to form pure polymer basecoat layers. After forming the pure polymer basecoat layers, a precursor material for an anti-friction coating layer may be applied in the manner described above, by spraying (i) a powderized thermoplastic precursor material, (ii) a first lubricant particle and (iii) a second lubricant particle, to a wear surface of a component.

In certain aspects, each heating step not only facilitates spreading of the powder material to form a substantially uniform coating over the wear surface(s) of the component, but in the case where lubricant PTFE particles are present, further promotes migration and agglomeration of the PTFE particles at the exposed surface of the coating, so that the exposed portion of the coating has a higher concentration of the PTFE particles. Generally, PTFE does not have a strong affinity to polymer matrices, and its electronegativity leads to little attraction to conventional polymer molecular architecture, thus forming agglomerations absent shear-induced mixing. Thus, PTFE can migrate to a surface in a polymeric composite matrix, particularly at the concentrations employed with certain embodiments of the inventive coatings. While not limiting in the present teachings to any particular theory, it is believed that PTFE migrates to an exposed surface mainly for two reasons, including increased density of PTFE (typically on the order of 2.10 to 2.25 g/cc) versus that of standard thermoplastic polymer matrices (1.1 to 1.4 g/cc) and the enhanced melt-viscosity of the PTFE compared to the much lower conventional thermoplastic melt-viscosities, which tends to lead to composite coatings containing a PTFE resin rich exposed surface.

Further, in sliding-type abrasive wear against a metallic substrate, a portion of the PTFE in a composite generally transfers as a thin film to the counter-face. The low coefficient of friction of PTFE leads to an improved wear interface between the polymer composite and the metallic substrate. This sliding layer (the transferred PTFE on the counter-surface) is not physically bonded to the surface, so it can be physically removed from the metallic substrate under certain conditions.

The substantially uniform anti-wear coating that is formed thus protects an underlying wear surface and forms an anti-wear surface or bearing that is a thermoplastic composite coating applied to a metallic substrate, optionally in distinct layers. For example, an anti-wear coating can be applied to a component, such as a drive bearing region or hub directly machined into an orbiting scroll component of a scroll compressor. The coating is thus capable of being built up to a desirable thickness in a controlled manner via deposition of layers of a powderized precursor material (the polymer composite containing appropriate lubricant fillers). Such control over material thickness is a vast improvement over that of the standard DU type sleeve bearing, discussed previously. In certain aspects, each respective layer can be about 25 μm (about 0.001 inches) on a wear surface (e.g., on each side of a bearing surface), although in certain alternative embodiments, thicknesses for each layer of up to 0.003 to 0.004 inches can be deposited.

In various aspects, the anti-wear coating thus formed has a relatively low coefficient of friction. Such a coefficient of friction generally measures an amount of resistance that a surface exerts on other materials or objects moving over it and is typically equal to a ratio between a maximal frictional force that the surface exerts and the force pushing the material or object toward the surface. A static coefficient of friction ($\mu_s$) is the coefficient of friction that applies to materials or objects that are motionless, while a kinetic or sliding coefficient of friction ($\mu_k$) is the coefficient of friction for objects that are in motion. In certain aspects, the thermoplastic polymer comprises PEEK, which has a kinetic coefficient of friction ($\mu_k$) of greater than or equal to about 0.33 to less than or equal to about 0.36. A PTFE lubricant particle has a kinetic coefficient of friction ($\mu_k$) of greater than or equal to about 0.06 to less than or equal to about 0.08. A $MoS_2$ lubricant particle has a kinetic coefficient of friction ($\mu_k$) of greater than or equal to about 0.03 to less than or equal to about 0.06. In certain non-limiting aspects, the anti-wear coating is a composite of such a thermoplastic polymer and lubricant particles that optionally has a kinetic coefficient of friction ($\mu_k$) of greater than or equal to about 0.03 to less than or equal to about 0.15.

In certain aspects, the methods of the present disclosure may include further preparing the portions of the wear surface that will receive the anti-wear coating. Thus, prior to the applying, the wear surface of the metal component is optionally exposed to a blasting process. In various aspects, blasting is conducted with one or more abrasives propelled towards the metal substrate or surface at a relatively high velocity. Such abrasives are often referred to as "shot" or "blast media" and include particles or fragments of materials which erode the corroded surface layer and/or the metal substrate. A non-limiting list of blast media that may be used for blasting include glass or sand, cut metal fragments or particles, such as aluminum oxide or stainless steel particles, metal shot or beads, and combinations thereof. In certain aspects, a suitable blasting media comprises aluminum oxide particles.

In certain aspects, the wear surface to be coated is blasted by a media that is abrasive enough to generate a surface profile having significant texture and/or surface roughness. Surface morphology or texture can be characterized by roughness, waviness, and lay. The roughness refers to a shortest wavelength of irregularities of a surface, e.g., the relatively finely spaced surface irregularities, the height, width and directions of which establish a predominant surface pattern. Waviness generally measures the more widely spaced (longer wavelength) deviations of a surface from its nominal shape. The lay indicates whether the surface texture has a predominant direction, in other words whether the surface is anisotropic.

In various aspects, the surface profile (the two-dimensional profile of the surface taken perpendicular to the lay, if any) of the metal surface after the blasting process has a high average surface roughness ($R_a$), optionally greater than or equal to about 140 μm, optionally greater than or equal to 150 μm, optionally greater than or equal to about 160 μm, optionally greater than or equal to about 170 μm, optionally greater than or equal to about 180 μm, optionally greater than or equal to about 190 μm, optionally greater than or equal to about 200 μm, optionally greater than or equal to about 210 μm, and in certain variations, optionally greater than or equal to about 220 μm. In certain variations, the metal surface after the blasting process has a high average surface roughness ($R_a$) ranging from greater than or equal to about 140 μm to less than or equal to about 225 μm.

In certain variations, prior to the applying, the wear surface of the metal component is exposed to a first blasting process so as to provide the wear surface with a surface roughness ($R_a$) of greater than or equal to about 140 μm. The present methods may include multiple distinct successive blasting processes to achieve the desired surface roughness ($R_a$) of the wear surface prior to applying the precursor material powder. Thus, in certain variations, after a first blasting process, the wear surface of the metal component is exposed to a second blasting process. For example, a second blasting process can be conducted to provide the wear surface with a surface roughness ($R_a$) of greater than or equal to about 200 μm prior to applying the precursor powder material. Other subsequent blasting processes are likewise contemplated.

The blast media thus comprises blasting particles. Surface finish achieved by blasting is often dependent on the number of blasting steps, the blasting time, pressure, and blast media selected. The blast media particles may be selected to achieve a given surface finish, such as those within the surface roughness ranges ($R_a$) described above. Notably, regions of the surface that will not have any anti-wear coating applied may be masked to protect the underlying substrate during the blasting process, as well as the application process for the precursor material powder.

Therefore, certain aspects of the present disclosure may include blasting of one or more regions of the wear surface prior to applying the precursor material powder. Furthermore, in certain alternative embodiments, prior to applying the precursor material powder, an undercoating of primer can be applied to the wear surface, followed by applying of the precursor powder material to the wear surface (which is subsequently heated to form the substantially uniform anti-wear coating). Thus, after the blasting process, the primer material may optionally be applied to the blasted portions of the wear surface. In certain variations, a particularly suitable primer comprises a polyamide imide polymer. In certain variations, a primer, like the polyamide-imide (PAI) based primer, is applied to the metal wear surface at a thickness of less than about 25 μm (about 0.001 inches); optionally at a thickness of less than or equal to about 15 μm (about 0.0006 inches); and in certain aspects the primer is applied at a thickness of greater than or equal to about 12 μm (about 0.00047 inches) to less than or equal to about 13 μm (about 0.0005 inches).

In certain embodiments, the methods of the present disclosure may include the following. First, the substrate may be optionally heated to remove organic contaminants. Then, the substrate is bead blasted to create a predetermined surface roughness. An optional primer is sprayed as a base coating onto the desired regions of the substrate. Such a primer may be a polyamide imide (PAI) based primer coating or a polyetheretherketone (PEEK) based primer coating. The primer may then be heated or baked to promote adhesion to the underlying substrate. The substrate and primer are then cooled. In alternative embodiments, no primer is necessary, depending on various factors, including the substrate material and surface roughness, the polymers applied, fillers applied, and the like.

A precursor material comprising the precursor powder material including a thermoplastic polymer and one or more lubricant particles is then applied via spraying to one or more target regions of the substrate (in the regions having the primer coating applied). The precursor powder material is applied, optionally in multiple distinct layers, to a total thickness of greater than or equal to about 25 µm (about 0.001 inches) to less than or equal to about 38 µm (about 0.0015 inches) in certain variations. In certain aspects, a layer, for example, comprising a thermoplastic, such as polyaryletherketone (PAEK), may be applied at a thickness of greater than or equal to about 76 µm (about 0.003 inches) to about 102 µm (about 0.004 inches) in a single application. This is advantageous as the layer can be built up without multiple passes. The sprayed on precursor material is then baked to adhere and promote crystalline melting or softening of the thermoplastic polymer on the substrate to form the substantially uniform coating. The substrate having the sprayed precursor material is allowed to cool. In an optional finishing step, the anti-wear coated surface may be lapped (polished) to improve surface roughness and to enhance flatness of the wear surface. Such a lapping process may enhance sealing where the wear surface is a face seal, for example.

In other embodiments, the methods of the present disclosure may provide the following. First, the substrate may be optionally heated to remove organic contaminants. Then, the substrate is bead blasted to create a predetermined surface roughness. An optional primer is sprayed as a base coating onto the desired regions of the substrate. Such a primer may be a polyamide imide (PAI) based primer coating. The primer may then be heated or baked to promote adhesion to the underlying substrate. The substrate and primer are then cooled.

A first basecoat precursor material comprising a first precursor powder material including a thermoplastic polymer is applied via spraying to one or more target regions of the substrate (in the regions having the primer coating applied or in the case where primer is omitted directly to the wear surfaces). The precursor powder material is applied, optionally in multiple distinct pure polymer layers, to a total thickness of greater than or equal to about 20 µm (about 0.0008 inches) to less than or equal to about 35 µm (about 0.0014 inches). The basecoat pure polymer primer layer can be built up as multiple layers with multiple passes. The sprayed on basecoat/primer precursor material is then baked to adhere and promote crystalline melting or softening on the substrate to form a substantially uniform coating. The substrate having the sprayed precursor material is allowed to cool.

A precursor material comprising a second precursor powder material including a thermoplastic polymer and one or more lubricant particles can then be applied via spraying to one or more target regions of the substrate to form an anti-wear coating topcoat over the basecoat. The topcoat material is applied, optionally in multiple distinct anti-wear coating layers, to a total thickness of greater than or equal to about 20 µm (about 0.0008 inches) to less than or equal to about 35 µm (about 0.0014 inches). The sprayed topcoat precursor material is then baked to adhere and promote crystalline melting or softening on the substrate to form a substantially uniform coating. The substrate having the sprayed precursor material is allowed to cool. In an optional finishing step, the anti-wear topcoat surface may be lapped (polished) to improve surface roughness and to enhance flatness of the wear surface. Such a lapping process may enhance sealing where the wear surface is a face seal, for example.

In certain preferred variations, the anti-wear coating formed in such a process is formed from a precursor powder material that comprises a thermoplastic precursor powder material, which comprises a polyarylether ketone (PAEK), such as polyetheretherketone (PEEK), a first lubricant particle comprising $MoS_2$ and a second lubricant particle comprising polytetrafluoroethylene (PTFE). In this regard, the methods of the present disclosure facilitate forming an anti-wear surface having a PAEK layer filled with both the first lubricant and the second lubricant particle. In certain embodiments, the methods of the present disclosure facilitate forming an anti-wear surface having a PEEK layer filled with both the first lubricant and the second lubricant particle. Such methods are capable of forming a PTFE-rich layer on top of or along the exposed surface of the anti-wear coating.

In certain variations, a primer basecoat, like the polyamide-imide (PAI) based primer or polyetheretherketone (PEEK) based primer, is applied to the metal wear surface at a thickness of about 12 to 13 µm (about 0.0005 inches). The primer layer is sprayed in a single application step and then baked. Then, a precursor powder material comprising about 71% by weight PEEK having about 11% by weight of $MoS_2$ and about 19% by weight of PTFE is applied in two distinct sequential spraying steps to the primer layer. A baking process is conducted between each of the spraying steps. The final thickness of the anti-wear coating is optionally greater than or equal to about 0.002 inches (about 51 µm) to less than or equal to about 0.003 inches (about 76 µm). In certain other variations, the anti-wear material may comprise one or more basecoat layers comprising a first thermoplastic polymer and an anti-wear coating topcoat disposed over the basecoat layers comprising a second thermoplastic polymer and at least one lubricant particle, where the total thickness of the anti-wear material is greater than or equal to about 0.002 inches (about 51 µm) to less than or equal to about 0.003 inches (about 76 µm).

In certain aspects, the anti-wear coatings of the present teachings are particularly suitable for use in conjunction with a compressor. For example, the inventive anti-wear coatings can be applied to wear regions of multiple different kinds of compressors, including scroll, rotary vane, centrifugal, single screw, twin screw, reciprocating, and the like. All potential bearing surfaces or wear surfaces in a compressor may be coated with an anti-wear coating according to the present disclosure. Various components can experience harsh conditions during compressor operation, as many are continually subjected to refrigerant materials and oils, high temperatures, corrosive environments, and high physical stresses, particularly torsional stress. The components are thus formed of materials that are wear-resistant, but also have strength sufficient to withstand fatigue and stress in such an environment. In certain preferred aspects, the anti-wear coatings of the present teachings are particularly suitable for use in conjunction with a component of a scroll compressor.

In certain aspects, a wear rate is determined by a standard pressure-velocity (PV) test, for PV=50,000 ft·lb/in$^2$·min (with Wear Factor Units=(in$^3$ min/ft/lb/hr)E$^{-10}$. A standard velocity of 200 ft/min is used for testing and a counter-face surface is formed of C1018 Steel. A standard thermosetting polyimide has a wear rate under such conditions of about 8 to about 10. The anti-wear coating composites on the other hand have a wear rate of greater than or equal to about 8 to about 100. In certain variations, the wear rate is greater than about 100. As appreciated by those of skill in the art, such wear rates can vary significantly depending on the surface finish of components, use of fluid media versus dry conditions, temperature, and substrate (metallic composition) to which the coatings are applied.

In various aspects, the scroll component comprises a metal that defines at least one wear surface. The metal may include iron, aluminum, and titanium, including alloys thereof, like steel or stainless steel. Further, the components may be formed of a metal by casting, sintering of a powder metal, stamping, extruding, die-casting, and the like. The metal wear surface of the component may be machined, lapped, and/or polished, prior to applying the anti-wear coatings of the present teachings.

In certain scroll machines, without adequate lubricity and robust wear surfaces, components formed of conventional ferrous-based or aluminum-based metal materials have the potential to prematurely degrade upon prolonged exposure to high friction conditions and inadequate lubrication, so that particulate and debris can form in the compressor which adversely contaminate certain bearings, particularly the lower bearing, to reduce service life. This is particularly an issue in hermetic scroll devices, which require long-term durability of all internal components hermetically sealed in the shell, because maintenance and replacement components or bearings are typically not an option. However, use of the inventive anti-wear coatings provides low friction wear surfaces having long-term thermal stability and robustness that can prolong the service life of the various components in a compressor.

In certain aspects, a compressor having a component with an inventive anti-wear coating can withstand running high loads without showing significant wear and is capable of use for at least 1,500 hours of compressor operation without failure. In certain aspects, a compressor having a component with an inventive anti-wear coating can withstand at least 2,000 hours of compressor operation. In yet other aspects, the compressor component having an inventive anti-wear coating is capable of use for at least 2,500 hours of compressor operation.

As further reference, the drawings and in particular FIG. 1, show a conventional refrigerant scroll compressor 10 that includes a generally cylindrical hermetic shell 12 having a cap 14 welded at the upper end thereof. Cap 14 is provided with a refrigerant discharge 18, which may have the usual discharge valve therein. Other major elements affixed to the shell include a compressor inlet 79 having a fitting (not shown); a transversely extending partition 22 which is welded about its periphery at the same point that cap 14 is welded to shell 12. A discharge chamber 23 is defined by cap 14 and partition 22.

A motor 28 including a motor stator 30 is disposed between the main bearing housing 24 and lower bearing support 26. A drive or crankshaft 32 (an alternative embodiment of which is shown in detail in FIG. 5) has an eccentric crank pin 34 at the upper end thereof and is rotatably journaled in an upper bearing 35. The upper bearing 35 can include a conventional drive bushing 36 adjacent to (e.g., press-fitted therein). Thus, a cylindrical hub 61 of an orbiting scroll 58 receives the eccentric crank pin 34 and the upper bearing 35. The crankshaft 32 is also supported by and rotatably journaled in a lower bearing assembly 38 attached to a lower bearing support 26. In a central region of the scroll compressor 10, the crankshaft 32 passes through and rotates within an aperture 41 of main bearing housing 24, which may include a cylindrical main bearing member 37 disposed within aperture 41.

A main bearing housing 24 and lower bearing support 26 each define radially outwardly extending legs, which are each secured to the shell 12. The upper surface of the main bearing housing 24 is provided with a flat thrust bearing surface 56 on which is disposed the orbiting scroll 58 having a spiral wrap or vane 60 extending therefrom. Projecting downwardly from the lower surface of orbiting scroll 58 is the cylindrical hub 61. As discussed previously, in conventional designs, the upper bearing 35 is a self-lubricating sleeve type bearing that receives the drive bushing 36 therein. The cylindrical hub 61, upper bearing 35 and drive bushing 36 each define a concentric inner bore 66, in which crank pin 34 of crankshaft 32 is drivingly disposed.

Figure 4:
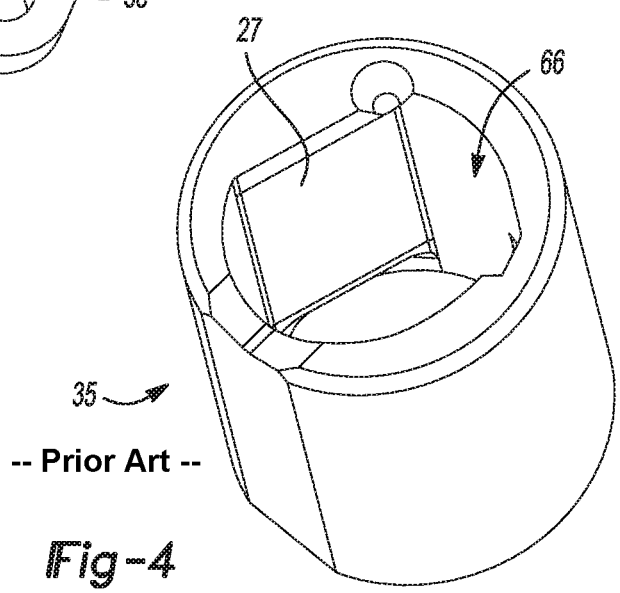
FIG. 4 is a perspective view of a drive bushing for a scroll compressor having a conventional design.

As shown in more detail in FIG. 4, drive bushing 36 has an inner generally circumferential bore 66. However, a portion of the bore 66 defines a drive flat surface 27 that can receive the crank pin 34, which itself has a flat surface that drivingly engages the drive flat surface 27 formed in a portion of bore 66 to provide a radially compliant driving arrangement, such as shown in assignee's U.S. Pat. No. 4,877,382, the disclosure of which is hereby incorporated herein by reference.

Non-orbiting scroll 70 is provided having a spiral wrap or vane 72 positioned in meshing engagement with the orbiting spiral vane 60 of orbiting scroll 58. Non-orbiting scroll 70 has a centrally disposed discharge passage 74 defined by a base plate portion communicating with an upward opening 82 which is in fluid communication with the muffler discharge chamber 23 defined by cap 14 and partition 22. Non-orbiting scroll 70 also includes an annular hub or raised shoulder portion 77 which surrounds the discharge passage 74. An annular recess 76 is also formed in non-orbiting scroll 70 within which is disposed a floating seal assembly 71.

An intake compartment 75 is in fluid communication with compressor inlet 79 through which the fluids (e.g., refrigerant) to be compressed within the intermeshed spiral vanes 60, 72 (for compression) are introduced. After the fluid passes through intake compartment 75, it is compressed in the spiral vanes 60, 72, so that the pressurized fluid is then released through the discharge passage 74. A reed valve assembly 78 or other known valve assembly is provided in the discharge passage 74 to regulate flow from the discharge passage 74 to through opening 82 and into discharge chamber 23.

The floating seal assembly 71 is supported by the annular recess 76 of non-orbiting scroll 70 and engages a seat portion 73 mounted to the partition 22 for sealingly dividing intake compartment 75 from discharge chamber 23. Recess 76 and floating seal assembly 71 cooperate to define an axial pressure biasing chamber which receives pressurized fluid being compressed by spiral vanes 60 and 72 so as to exert an axial biasing force on non-orbiting scroll 70 to thereby urge the tips of respective spiral vanes 60, 72 into sealing engagement with the opposed baseplate surfaces.

The lower portion of the interior of shell 12 defines an oil sump 46 which is filled with lubricating oil. Bore 40 acts as a pump to force lubricating fluid up the crankshaft 32 and into bore 42 and ultimately to all of the various portions of the compressor which require lubrication. Crankshaft 32 is rotatably driven by electric motor 28 including motor stator 30, windings 48 passing there through, and a motor rotor 50 press fitted on crankshaft 32 and having upper and lower counterweights 52 and 54, respectively.

Figure 2:
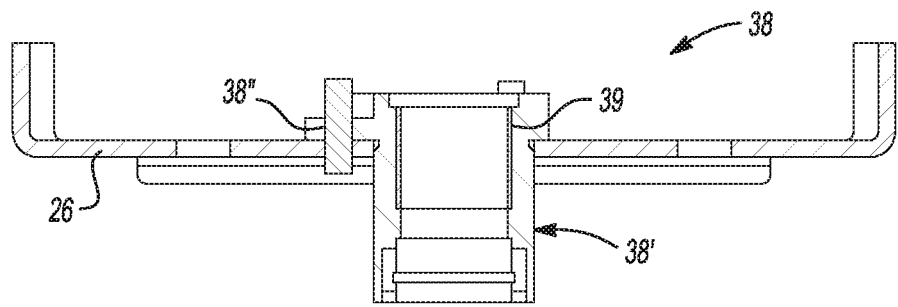
FIG. 2 is a partial sectional view showing a lower bearing assembly as in FIG. 1.
Figure 3:
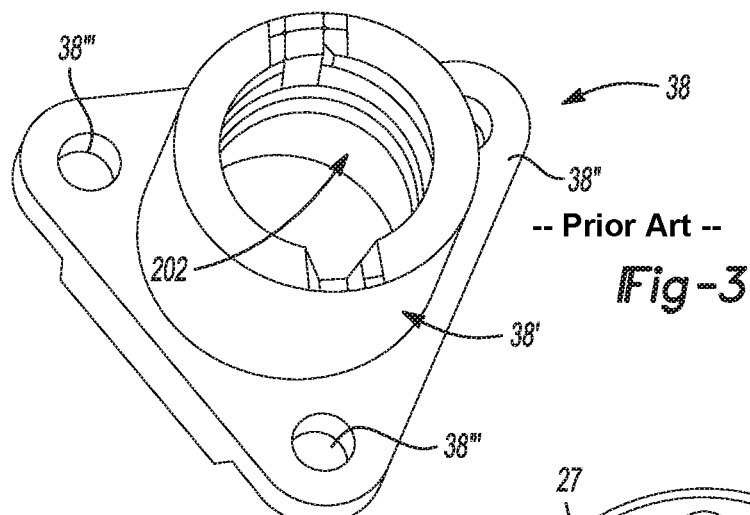
FIG. 3 is a perspective view showing a portion of the components of the lower bearing plate assembly in FIG. 2.

An Oldham coupling 68 is disposed between orbiting scroll 58 and main bearing housing 24. The Oldham coupling 68 is keyed to orbiting scroll 58 and non-orbiting scroll 70 and thus prevents rotational movement of orbiting scroll 58. Oldham coupling 68, as shown in FIG. 1, for example, can be of the type disclosed in assignee's U.S. Pat. No. 5,320,506, the disclosure of which is hereby incorporated herein by reference As illustrated in FIGS. 2 and 3, a conventional lower bearing assembly 38 includes a lower wear surface having a cylindrical opening 202 extending there through and a radially extending flange portion 38'' having a plurality of mounting openings 38''' therein that allow the bearing housing 38' to be mounted to the lower bearing support 26. A self-lubricating cylindrical lower bearing 39 is received in the bearing housing 38' and is disposed directly against the crankshaft 32. Crankshaft 32 has at the lower end a relatively large diameter concentric bore 40 which communicates with a radially outwardly smaller diameter bore 42 extending upwardly therefrom from the top of crankshaft 32.

The following detailed discussion pertains to the various wear surfaces in a scroll compressor on which the anti-wear coating of the present teachings can be applied. Any variation or combination of the anti-wear coating embodiments described above is contemplated for use in conjunction with the scroll component wear surface. The inventive anti-wear coatings are particularly suitable for coating various wear surfaces (in other words, surfaces that experience repeated frequent contact with nearby surfaces or parts and thus experience wear) in a scroll compressor, including various bearing surfaces. In certain aspects, the present teachings contemplate use of the inventive thin anti-wear coating(s) on a wear surface or bearing surface in a scroll compressor in lieu of a typical conventional sleeve bearing. In certain aspects, an anti-wear coating can be used on various wear surfaces in lieu of the sleeve-type main bearing member 37, the sleeve-type upper bearing 35 within cylindrical hub 61 of orbiting scroll 58, and/or the sleeve-type lower bearing assembly 38.

More specifically, the anti-wear coating can be applied to a wear surface, such as a flat portion of a drive shaft that defines a wear surface that can then interface with the hub or a bushing in the orbiting scroll by way of non-limiting example. Thus, a conventional bearing or bushing disposed in the hub is not required. Alternatively, the scroll compressor component having the wear surface coated with an anti-wear coating may include the hub or a bushing that interfaces with the flat portion of the crankshaft having anti-wear coating to improve overall performance and reduce wear.

Figure 5:
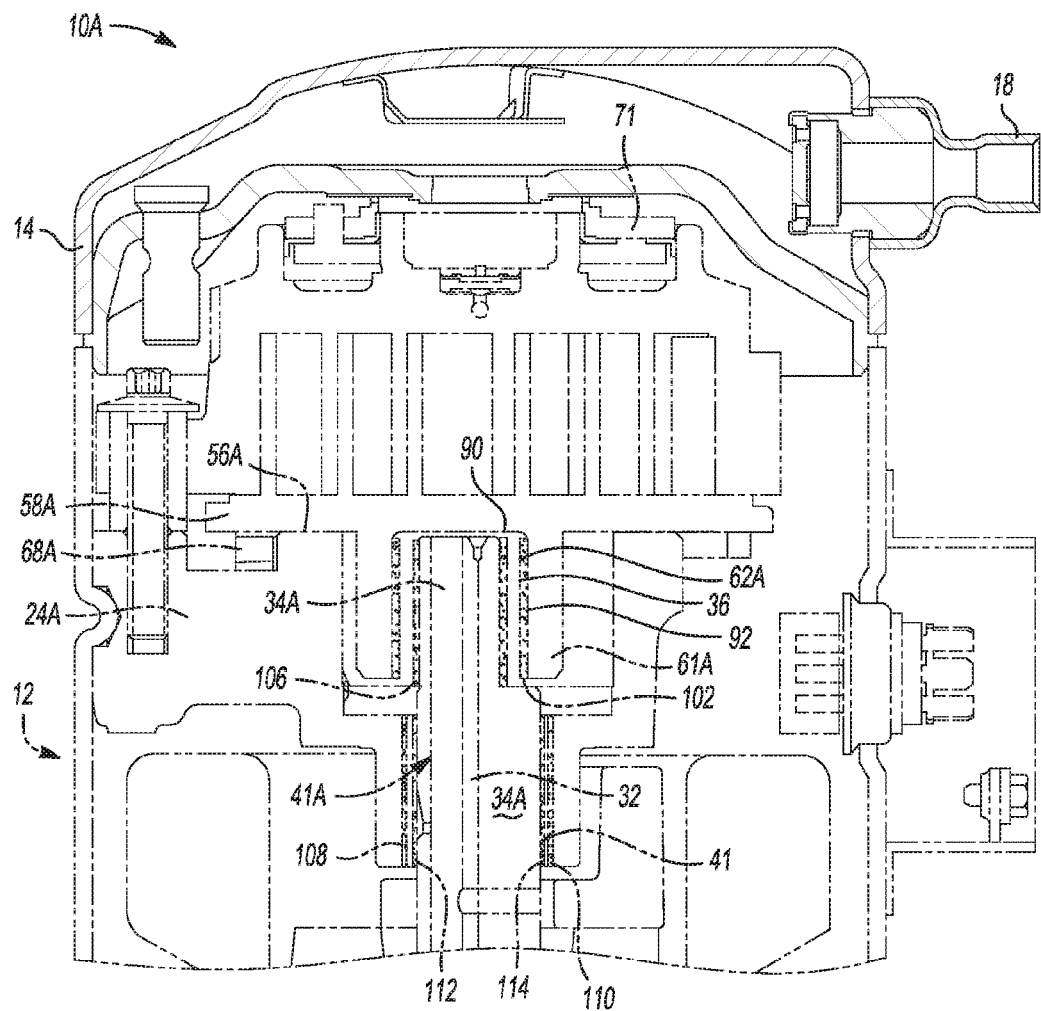
FIG. 5 is a detailed sectional view of a top portion of a scroll compressor prepared in accordance with certain principles of the present disclosure.

For example, in FIG. 5, an alternative embodiment of a scroll compressor 10A is shown where conventional sleeve-type bearings (the sleeve-type main bearing member 37, the sleeve-type upper bearing 35 and the sleeve-type lower bearing 39 in FIG. 1) have been eliminated. For brevity, to the extent that the components in the following embodiments and the accompanying Figures are the same as those described in the context of FIG. 1, they can be assumed to have the same configuration and function and will not be expressly discussed herein. In the scroll compressor in FIG. 5, one or more anti-wear coatings 90 can be optionally introduced instead to these wear surfaces to rotatably support and interface with rotating crankshaft 32A in accordance with certain aspects of the present teachings. It should be noted that while each of the sleeve-type main bearing member 37, the sleeve-type upper bearing 35 and the sleeve-type lower bearing 39 of FIG. 1 are shown to be replaced in FIG. 5, it is contemplated that only a single one of these bearing members (or two of the three bearing members) can be replaced by applying an anti-wear coating. Furthermore, the anti-wear coatings 90 may have the same composition or there may be distinct anti-wear coating compositions used in different locations in the scroll compressor, as appreciated by those of skill in the art. This holds true for each scroll component and its respective wear surfaces, as discussed further below.

Figure 11A:
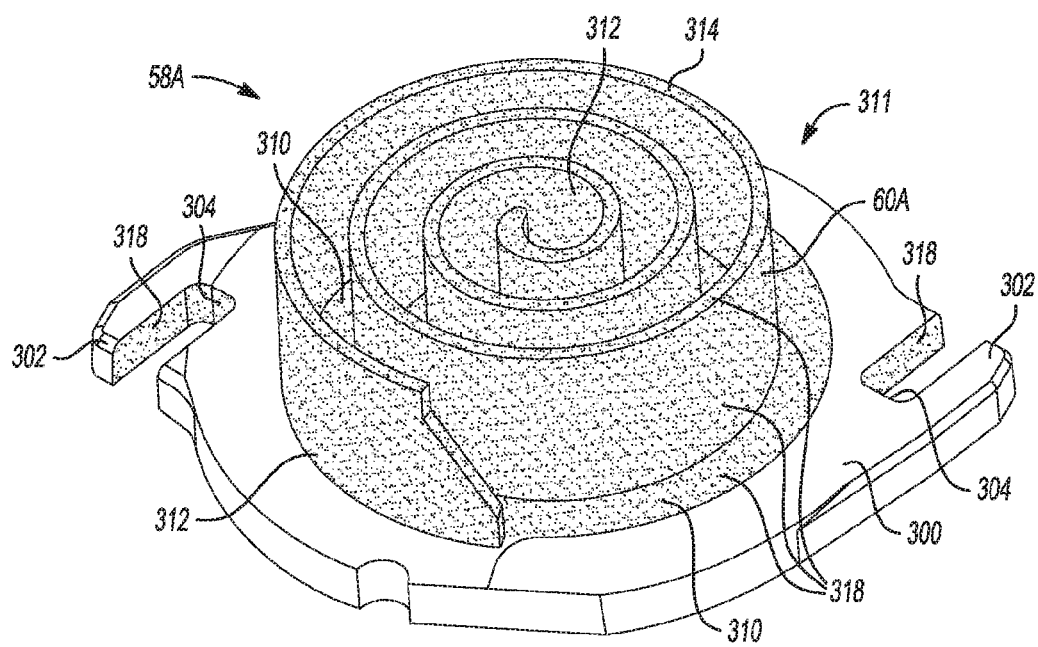
FIG. 11A is a perspective view of a first side of an orbiting scroll component for a scroll compressor according to certain principles of the present disclosure.
Figure 11B:
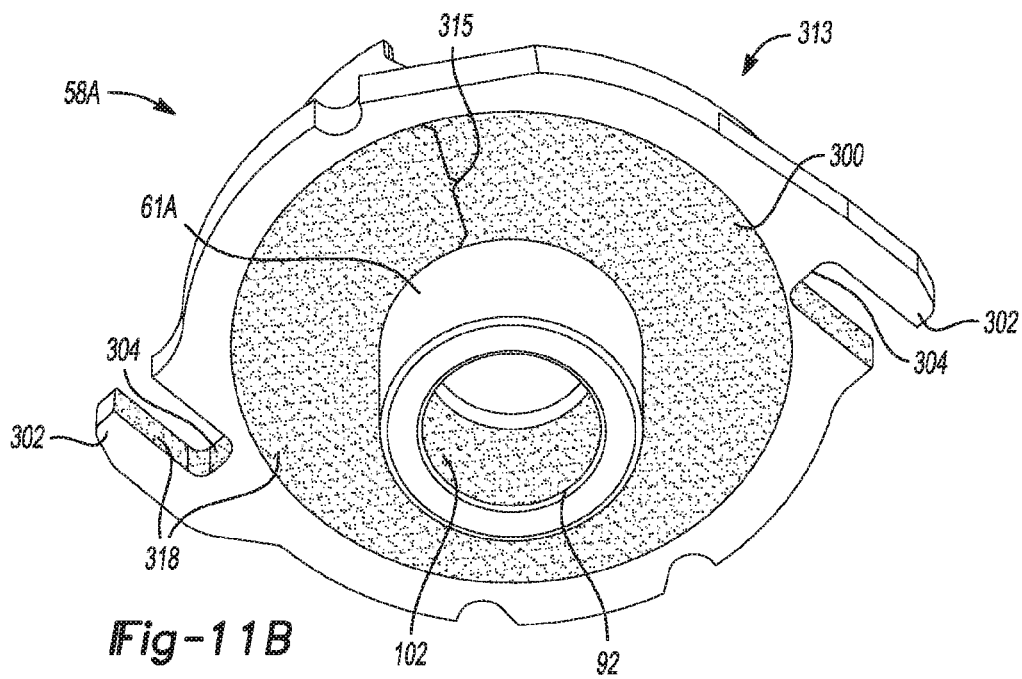
FIG. 11B is a perspective view showing a second side opposite to the first side of the orbiting scroll component of FIG. 11A.

As best seen in FIG. 11B, a cylindrical hub 61A of orbiting scroll 58A defines an inner circumferential wear surface 92 capable of receiving rotating crankshaft 32A. The circumferential wear surface 92 of cylindrical hub 61A may house a drive bushing 36A (FIG. 7) define a drive flat surface 130 into which a flat drive surface 62A of crank pin 34A is drivingly disposed. In FIG. 11B, the hub's inner circumferential wear surface 92 has a first anti-wear coating 102 disposed on and covering the wear surfaces that will encounter friction in the inner diameter of cylindrical hub 61A.

Figures 6, 7:
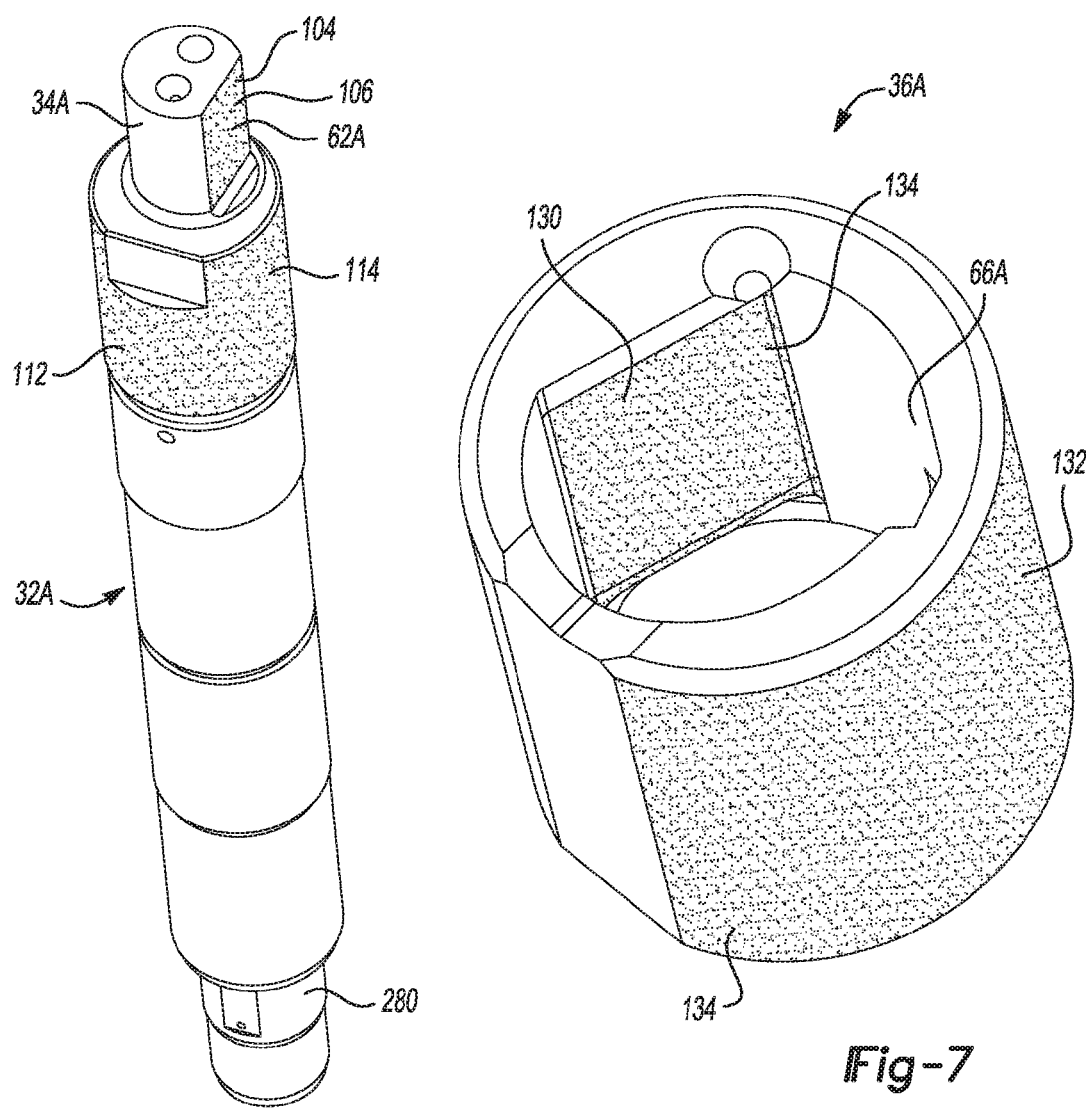
FIG. 6 is a perspective view of a crankshaft for a scroll compressor prepared in accordance with certain principles of the present disclosure.
FIG. 7 is a perspective view of a drive bushing for a scroll compressor prepared in accordance with certain principles of the present disclosure.

An upper region of crankshaft 32A corresponding to crank pin 34A likewise defines a wear surface 104 (including flat drive surface 62A), onto which a second anti-wear coating 106 is disposed (see also FIG. 6). In alternative variations, the drive bushing 36A may omit a fifth anti-wear coating 134, but have a similar shape to the crankpin 34A can be attached to the crankshaft 32A as an additional component with a drive flat surface like 62A. Such a drive bushing may be similarly coated with an anti-wear coating in other regions besides on the drive flat 130. Notably, it is preferable that two wear surfaces that engage and contact one another are formed of distinct materials to reduce friction and improve tribological properties. Thus, if both the inner circumferential wear surface 92 of cylindrical hub 61A and the wear surface 104 of crank pin 34A are coated with the first and second anti-wear coatings 102, 106, respectively, it is preferably that these material compositions are distinct from one another. In certain preferred variations, only one of the inner circumferential wear surface 92 of cylindrical hub 61A or the wear surface 104, including flat drive surface 62A of crank pin 34A has an anti-wear coating (either 102 or 106), while the other wear surface is not coated (for example, an exposed machined metal wear surface).

In alternative embodiments, the inner circumferential wear surface 92 of cylindrical hub 61A can receive a drive bushing (shown in FIG. 4) having the drive flat surface 27 for receiving the flat drive surface 62A of crank pin 34A for driving the orbiting scroll 58A. In such an embodiment, the first anti-wear coating 102 on the hub's 61A inner circumferential wear surface 92 can optionally be omitted. Therefore, drive bushing 36 can be seated in the cylindrical hub (61 of FIG. 1 or 61A of FIG. 5) and can thus receive crank pin (34 or 34A). Referring to FIG. 7, the drive bushing 36A prepared in accordance with certain aspects of the present technology is shown. Specific wear surfaces of the drive bushing 36A, which may be optionally machined and can further have the fifth anti-wear wear coating 134 disposed thereon, including a drive flat surface 130, an inner bore 66A, and/or an outer circumferential surface 132 corresponding to an outer diameter of the drive bushing 36A. In FIG. 7, the fifth anti-wear coating 134 is disposed only on the drive flat surface 130 and outer circumferential surface 132 (but may be applied to other regions, such as the inner bore 66A). As discussed above, these surfaces are subject to wear from being engaged with the inner circumferential wear surface 92, optional upper bearing 35, or crank pin 34 or 34A and therefore one or all of these surfaces may be coated with the fifth anti-wear coating 134.

Figure 8A:
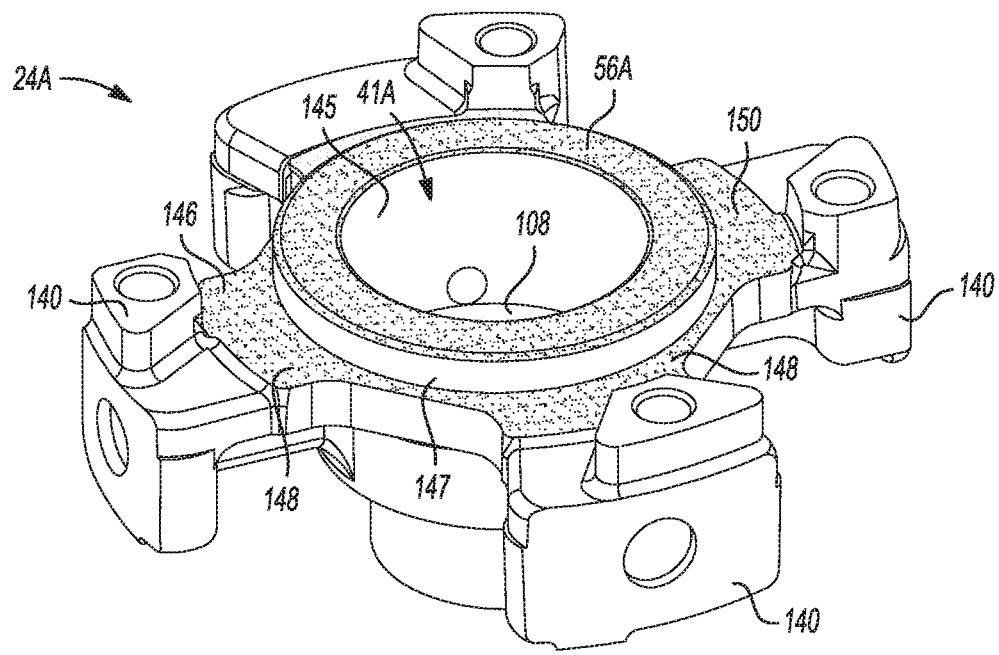
FIG. 8A is a perspective view of a main bearing housing defining a region for interfacing with an Oldham coupling ring according to certain principles of the present disclosure.
Figure 8B:
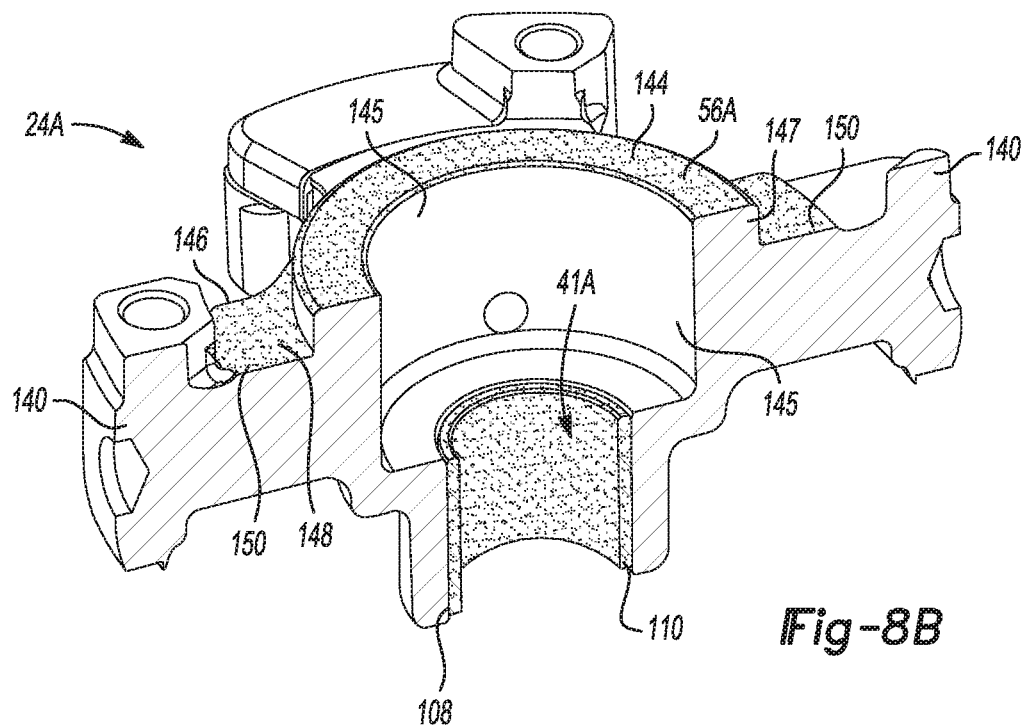
FIG. 8B is a cross-sectional view of the main bearing housing of FIG. 8A.

Similarly, as shown in FIGS. 5 and 8A-8B, main bearing housing 24A includes a centrally disposed aperture 41A disposed therein to receive crankshaft 32A. A plurality of arms or protrusions 140 connect and attach the main bearing housing 24A to the compressor shell 12. The centrally disposed aperture 41A (which as shown has two distinct diameters, including a wider diameter upper region and a narrower diameter lower region). The narrower region of the centrally disposed aperture 41A receives and supports the crankshaft 32A and thus defines a third wear surface 108 onto which a third anti-wear coating 110 may be disposed. A middle region of crankshaft 32A likewise defines a mid-shaft wear surface 112, or a main journal bearing surface, onto which a fourth anti-wear coating 114 can be disposed (see FIGS. 5 and 6). As discussed above, it is preferable that two wear surfaces that engage and contact one another are formed of distinct materials to reduce friction and improve tribological properties. Thus, if both the third wear surface 108 of the centrally disposed aperture 41A and the mid-shaft wear surface 112 of crankshaft 32A are coated with the third and fourth anti-wear coatings 110 and 114, respectively, it is preferably that these material compositions are distinct from one another. In certain preferred variations, only one of the mating third wear surface 108 and the mid-shaft wear surface 112 has an anti-wear coating (either 110 or 114), while the other wear surface is not coated (for example, an exposed metal wear surface).

With renewed reference to FIGS. 8A and 8B, other wear surfaces on the main bearing housing 24A that can be coated with anti-wear coatings are as follows. An annular thrust bearing surface 56A is shown on main bearing housing 24A onto which orbiting scroll 58A rests and orbits (as best shown in FIG. 5). FIG. 9 shows a perspective view of a thrust plate 57 that could be utilized in other scroll compressor designs (e.g., FIG. 15A). The thrust plate 57 likewise shows the annular thrust bearing surface 56A. This thrust bearing surface 56A can be likewise be coated with the sixth anti-wear coating 144 prepared in accordance with various aspects of the present teachings. In FIGS. 8A-8B, the third anti-wear coating 110 and the sixth anti-wear coating 144 are shown as discrete coatings, potentially made of different materials. Notably, while not shown, the third anti-wear coating 110 and the sixth anti-wear coating 144 maybe formed from the same material composition and thus form a same contiguous coating extending from a terminal end of the centrally disposed aperture 41A across an internal surface 145 corresponding to a first diameter of a circumferential region 147 to the annular thrust bearing surface 56A.

Another wear surface in the main bearing housing 24A is as follows. A plurality of structural recesses 146 is formed in the plurality of arms or protrusions 140 that attach the main bearing housing 24A to the shell 12. These recesses 146 extend around the circumferential region 147 to define one or more Oldham coupling receiving surfaces 148 onto which an Oldham coupling can be seated and disposed, so that the Oldham coupling 68 may slide in these recesses 146 against receiving surfaces 148 when the scroll compressor is assembled and operated. As shown, the Oldham coupling receiving surfaces 148 are formed as a single annular region disposed about the outer circumference of the circumferential region 147. Each of these Oldham coupling receiving areas (wear surfaces) 148 can also be optionally coated with a seventh anti-wear coating 150.

Turning now to FIGS. 10A and 10B, an Oldham coupling 68A is shown (assembled into the scroll compressor 10A in FIG. 5, as well). A first side 160 is shown in FIG. 10A, while a second opposite side 162 of the Oldham coupling 68A is shown in FIG. 10B. As discussed above, the Oldham coupling 68A is keyed to orbiting scroll 58A and to non-orbiting scroll 70 to prevent rotational movement of orbiting scroll 58A as it is driven by crankshaft 32.

A plurality of Oldham keys 170 is provided on Oldham coupling ring 171. A first pair of keys 172 is in a generally diametrically aligned relationship and each projects upward from a surface 174 of Oldham coupling ring 171. A second pair of keys 176 is likewise aligned diametrically apart on the Oldham coupling ring 171 and also projects upward from surface 174. The second pair of keys 176 generally extends farther upwards, so that the second pair of keys is capable of engaging with a non-orbiting scroll 70. The first pair of keys 172 is shorter and thus is capable of engaging with the orbiting scroll 58A. Oldham coupling 68A is guided in its translational movement by non-orbiting scroll keys 176 while being driven by orbiting scroll keys 172.

Figure 12:
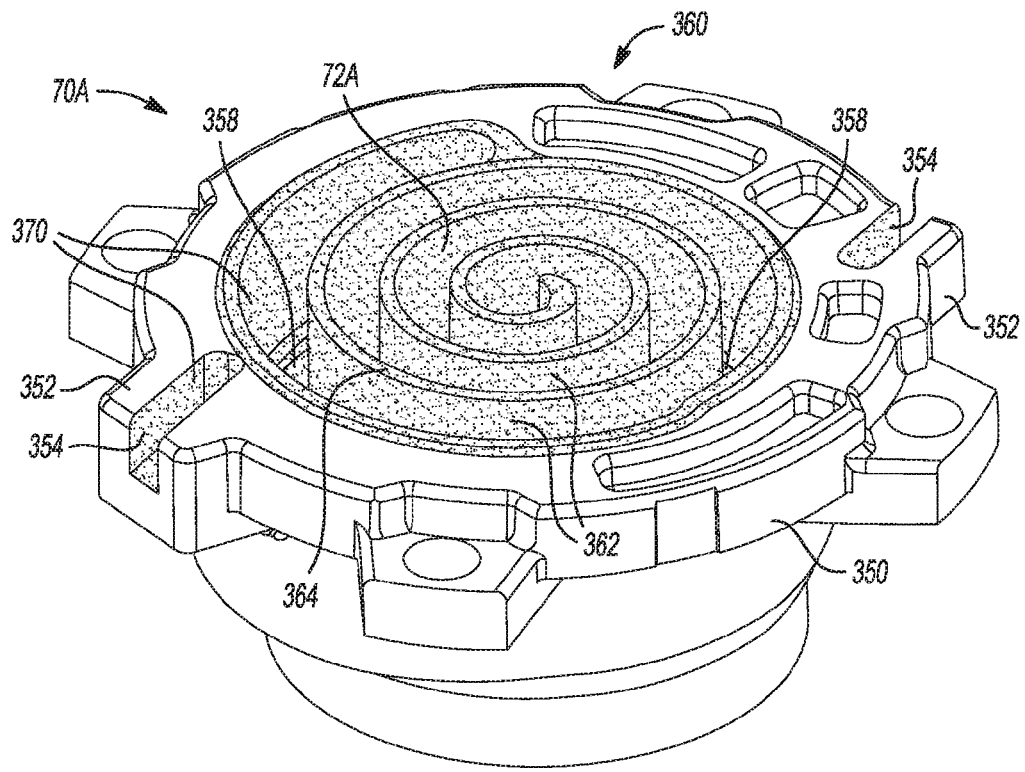
FIG. 12 is a perspective view of a fixed non-orbiting scroll component for a scroll compressor according to certain principles of the present disclosure.

As shown in FIGS. 11A and 11B, a baseplate 300 of orbiting scroll 58A is provided with a pair of outwardly projecting flange portions 302 each of which is provided with an outwardly opening slot 304. Slots 304 are sized to slidingly receive the first pair of Oldham keys 172. Likewise, as shown in FIG. 12, a baseplate 350 of fixed non-orbiting scroll 70A is provided with a pair of outwardly projecting flange portions 352, each of which is provided with an outwardly opening slot 354. Slots 354 are sized to slidingly receive the second pair of Oldham keys 176. The keys 172 and 176 have an axial length or height to engage with the respective scroll component, while avoiding projecting so far as to impede movement or operation of other components. Generally, vertical motion of Oldham coupling 68A is limited by contact of a plurality of Oldham pads 173 disposed on the second side 162 of Oldham coupling ring 171. As Oldham coupling 68A is driven, inertial and frictional forces tend to cause the plurality of Oldham pads 173 to contact the one or more Oldham coupling receiving surfaces 148 of the main bearing housing 24A.

Thus, a first plurality of Oldham coupling wear surfaces 178 is formed on the contact regions at the terminal end of each Oldham key 170 (whether in the first pair of keys 172 or second pair of keys 176). Each wear surface 178 on each Oldham key 170 can be coated with an eighth anti-wear coating 180. A second plurality of Oldham coupling wear surfaces 182 is raised and forms discrete contact regions along the first side 160 of the Oldham coupling ring 171 in a region near or adjacent to the Oldham keys 170. A third plurality of Oldham coupling wear surfaces 186 is formed on the contact regions at the terminal end of each Oldham pad 173 along the second side 162 of Oldham coupling ring 171. Thus, each respective wear surface, including wear surfaces 178, 182, or 186, on the Oldham coupling 68A can be coated with an eighth anti-wear coating 180. As noted above, for brevity, the coating is referred to as an eighth anti-wear coating, but may indeed include multiple distinct coatings applied to distinct wear surfaces of the component. Further, the anti-wear coating may be applied on only one of or only select wear surfaces of those described.

Thus, various wear surfaces of the Oldham coupling 68A that may be machined and can have an anti-wear wear coating applied, include the entire region of the Oldham keys 170 (or only the terminal contact regions/wear surfaces 178 of keys 170), any surfaces adjacent to the Oldham keys 170, including wear surfaces 182, and the Oldham pads 173 or other regions that may experience contact on Oldham coupling ring 171. As discussed above, these surfaces are subject to wear from being engaged with various other surfaces, including the orbiting scroll 58A and the non-orbiting scroll 70, or main bearing housing 24A.

With renewed reference to FIGS. 11A and 11B, various wear surfaces on the orbiting scroll 58A may also have an anti-wear coating applied in accordance with certain aspects of the present teachings, in addition to the first coating 102 applied to the inner circumferential wear surface 92 of the cylindrical hub 61A. One or more surface regions 310 on a first side 311 of baseplate 300 form wear surfaces that contact the opposing spiral wrap or vane during compressor operation (here a terminal end or tip of spiral wrap or vane 72 of non-orbiting scroll 70 in FIG. 1, for example). Likewise, the spiral vane 60A has various wear surfaces, including sidewalls 312 and terminal tips 314, which contact the opposing spiral vane 72 when they are intermeshed during compressor operation. Furthermore, as discussed above, the baseplate 300 comprises a slot 304 that slidingly receives the first pair of Oldham keys 172 and thus a wear surface is formed on the interior surface of the slot. Other portions of the baseplate 300 that contact other components (like portions of the main bearing housing or Oldham coupling or other adjacent scroll components) define wear surfaces that may be coated with the inventive anti-wear coatings, as well.

On a second opposite side 313 of baseplate 300 various wear surfaces are shown that can be coated with the inventive anti-wear coatings. In addition to the wear surfaces corresponding to the slots 304 on flange portions 302 for receiving the Oldham coupling keys, an annular thrust bearing surface 315 can contact the main bearing housing 24 and thus form a wear surface that can be coated with an inventive anti-wear coating (e.g., the ninth anti-wear coating 318).

Any of these orbiting scroll wear surfaces, including the one or more surface regions 310, internal surfaces of slots 304, annular thrust bearing surface 315, spiral vane 60A sidewalls 312 or terminal tips 314, can be coated with a ninth anti-wear coating 318. As discussed above, in conventional designs a sleeve-type bearing (having a cylindrical metal sleeve with a porous metal layer and a resin disposed therein) is press fitted into the cylindrical hub 61 and receives either the drive bushing 36 or can directly receive the crank pin 34 of crankshaft 32.

Further, baseplate 300 has cylindrical hub 61A that defines an the inner circumferential wear surface 92 that receives and rotatably supports either a flat surface of the crank pin 34A or drive bushing 36A disposed therein to receive the crankshaft 32A. In accordance with certain aspects of the present disclosure, the upper bearing 35 can be eliminated altogether, because the first anti-wear coating 102 can be applied directly to the hub's inner circumferential wear surface 92. When the first anti-wear coating 102 is present, a conventional sleeve bearing and/or bushing can be eliminated altogether, which provides environmental benefits and improvements in compressor performance.

As discussed above, typical sleeve bearings can have a 0.065 mm (0.002559 in.) diametrical tolerance range for the hub. This is a relatively large diametrical tolerance (far greater than the tolerances for a machined surface alone), which can result in greater clearances between the bearing wear surface and the opposing surface(s), such as between a hub's inner circumferential wear surface 92 and the crank pin 34. Because the overall thickness of the anti-wear coating is relatively small or thin, eliminating the typical bearing surfaces with the inventive anti-wear coatings advantageously tightens the tolerances between working or interfacing surfaces. This is particularly advantageous for scroll compressor applications in which low speeds and high loads are typically experienced, because smaller tolerances (more similar to the machined bearing surfaces) are desirable for more effective performance.

In certain alternative embodiments, the hub's inner circumferential wear surface 92 can be coated with the first anti-wear coating 102, but a bushing can also be used to receive the crankshaft. For example, drive bushing 36A described previously in the context of FIG. 7, for example, may be seated within the cylindrical hub 61A.

FIG. 12 shows the various wear surfaces on the non-orbiting scroll 70A, which may also have an anti-wear coating applied in accordance with certain aspects of the present teachings. One or more surface regions 358 on a first side 360 of baseplate 350 form wear surfaces that contact the opposing spiral wrap or vane during compressor operation (here a terminal end or tip of spiral wrap or vane 60 of orbiting scroll 58 in FIG. 1, for example). Likewise, the spiral vane 72A has various wear surfaces, including sidewalls 362 and terminal tips 364, which contact the opposing spiral vane 58 or baseplate 310 when they are intermeshed during compressor operation. Furthermore, as discussed above, the baseplate 350 comprises a protrusion 352 defining a slot 354 that slidingly receives the second pair of Oldham keys 176 and thus a wear surface is formed on the interior surface of the slot 354. Other portions of the baseplate 350 that contact other components (like portions of the partition 22, floating seal assembly 71, or other adjacent scroll components) define wear surfaces that may be coated with the inventive anti-wear coatings, as well. Hence, each respective wear surface on the non-orbiting scroll component 70A, including the one or more surface regions 358, the internal surfaces of slots 354, spiral vane 72A sidewalls 362 or terminal tips 364, can be coated with a tenth anti-wear coating 370. As with the prior embodiments, the present disclosure contemplates that the tenth anti-wear coating 370 can be applied to only one of the wear surfaces (or to select regions of a wear surface) and further can include a plurality of compositionally distinct coating materials disposed on different discrete wear surface regions.

Figure 13:
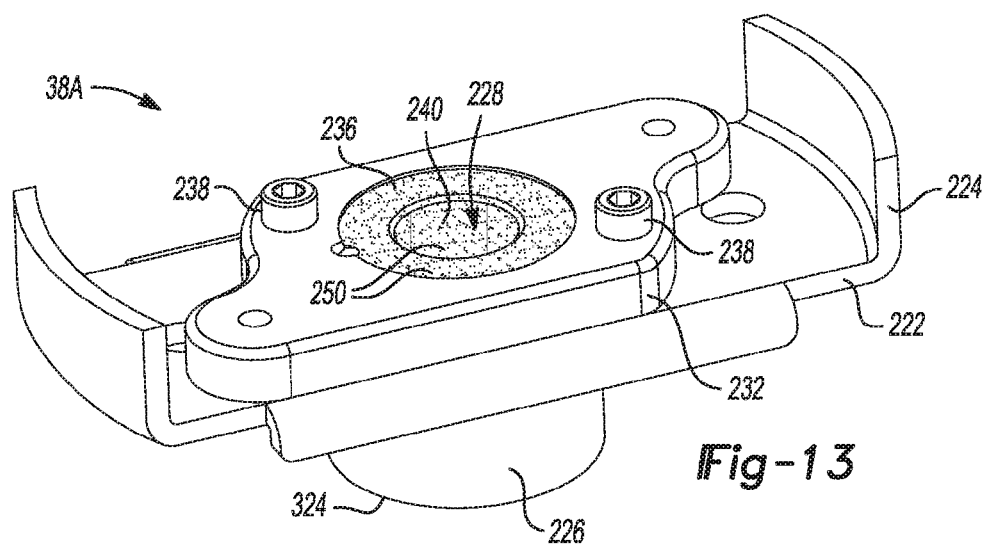
FIG. 13 is a perspective view of one embodiment of a lower bearing prepared in accordance with certain principles of the present disclosure.

With reference to FIG. 13, a lower bearing assembly 38A includes a bearing plate 222 that defines axially-extending legs 224 on opposite ends thereof. The bearing plate 222 is configured to extend across the interior of shell 12 with legs 224 engaged with and welded to the interior surface of shell 12 to hold bearing plate 222 in position. Bearing plate 222 may be made from a variety of materials, such as stamped metal. A lower hub 226 is centrally disposed within bearing plate 222, and includes an opening 228 through which crankshaft 32A extends. Lower hub 226 has an upwardly projecting portion 232 and a lower projecting portion 234 that has a generally circular periphery. The upwardly projecting portion defines an annular lower thrust bearing surface region 236, which is a wear surface that potentially contacts the crankshaft 32A. Lower hub 226 is rotationally and axially fixed to bearing plate 222 with a plurality of fasteners 238. An internal circumferential surface of lower hub 226 likewise defines a lower journal wear surface 240 that rotatably supports crankshaft 32A. Each of the wear surfaces on the lower bearing assembly 38A, such as the annular lower thrust bearing surface region 236 or the lower journal wear surface 240, can be coated with an eleventh anti-wear coating 250. As with the prior embodiments, the present disclosure contemplates that the eleventh anti-wear coating 250 can be applied to only one of the wear surfaces (or to select regions of a wear surface) and further can include a plurality of compositionally distinct coating materials disposed on different discrete wear surface regions.

Figure 14A:
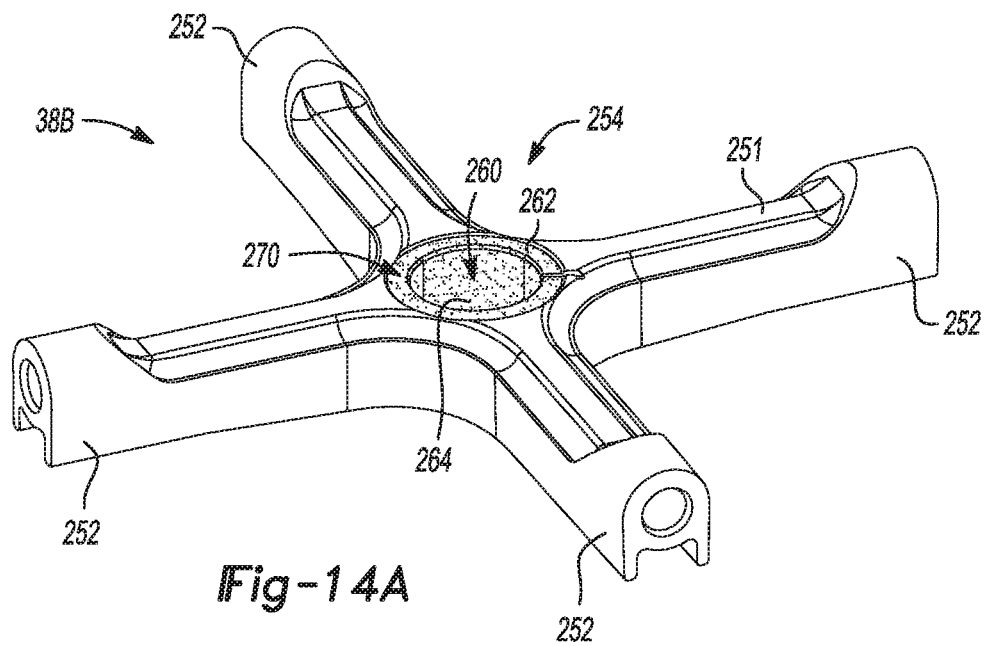
FIG. 14A is a perspective view of an alternative embodiment of a lower bearing prepared in accordance with certain principles of the present disclosure.
Figure 14B:
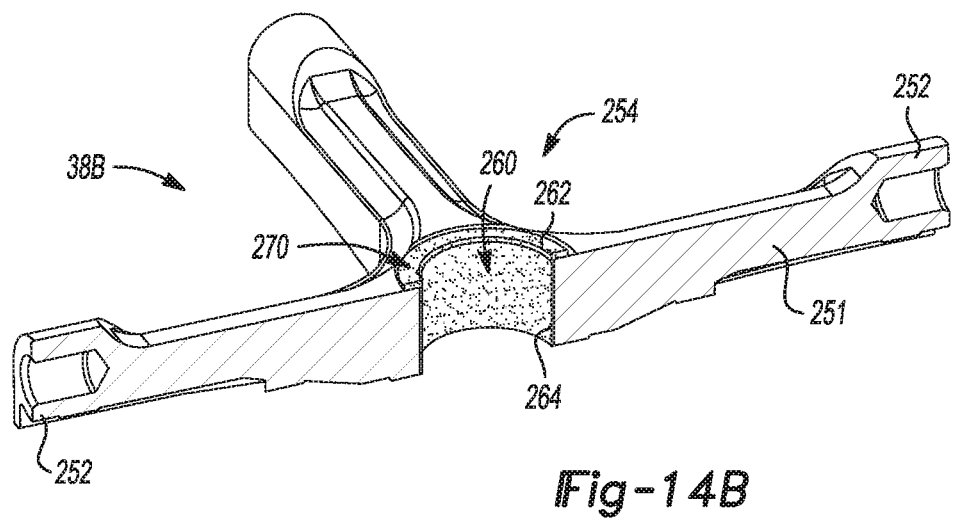
FIG. 14B is a sectional view of the lower bearing in FIG. 14A.

In an alternative embodiment of a lower bearing assembly 38B, as shown in FIGS. 14A and 14B, a support structure 251 defines four orthogonally-oriented legs 252. The support structure 251 is configured so that legs 252 extend across the interior of shell 12 and engage with and are fastened to the interior surface of shell 12 to hold the support structure 251 in position. A central region 254 of the support structure 251 is formed where legs 252 intersect and includes a centrally disposed opening 260 through which crankshaft 32A extends. A recessed annular lower thrust bearing surface region 262 is formed around centrally disposed opening 260 and thus is a wear surface that potentially contacts the crankshaft 32A during compressor operation. The centrally disposed opening 260 further defines an integrated circumferential surface that defines a lower journal wear surface 264 that rotatably supports crankshaft 32A. Each of the wear surfaces on the lower bearing assembly 38B, such as the recessed annular lower thrust bearing surface region 262 or the lower journal wear surface 264, can be coated with a twelfth anti-wear coating 270. As with the prior embodiments, the present disclosure contemplates the twelfth anti-wear coating 270 can be applied to only one of the wear surfaces (or to select regions of a wear surface) and further can include a plurality of compositionally distinct coating materials disposed on different discrete wear surface regions.

With renewed reference to FIG. 6, a terminal region of crankshaft 32A defines a lower wear surface 280 that interfaces with an opposing lower journal bearing wear surface in the lower bearing assembly (for example, annular lower thrust bearing surface region 236 or the lower journal wear surface 240 in lower bearing assembly 38A in FIG. 13 or the recessed annular lower thrust bearing surface region 262 or the lower journal wear surface 264 in lower bearing assembly 38B in FIGS. 14A and 14B). Each of the wear surfaces on the lower bearing assembly 38A or 38B can be coated with the eleventh or twelfth anti-wear coatings 250, 270. Likewise, the lower wear surface 280 of crankshaft 32A may include a fourteenth coating 282. As discussed above, in certain variations, counter surfaces that interact with one another are formed of material compositions that are distinct from one another to enhance tribological properties. In certain preferred variations, only one of the mating lower wear surface 280 of crankshaft 32A, lower journal wear surface 240 in the embodiment of FIG. 13 or the lower journal wear surface 264 shown in the embodiment of FIGS. 14A and 14B in the lower bearing assembly 38A or 38B has an anti-wear coating, while the other wear surface is not coated (for example, an exposed metal wear surface).

Figure 15A:
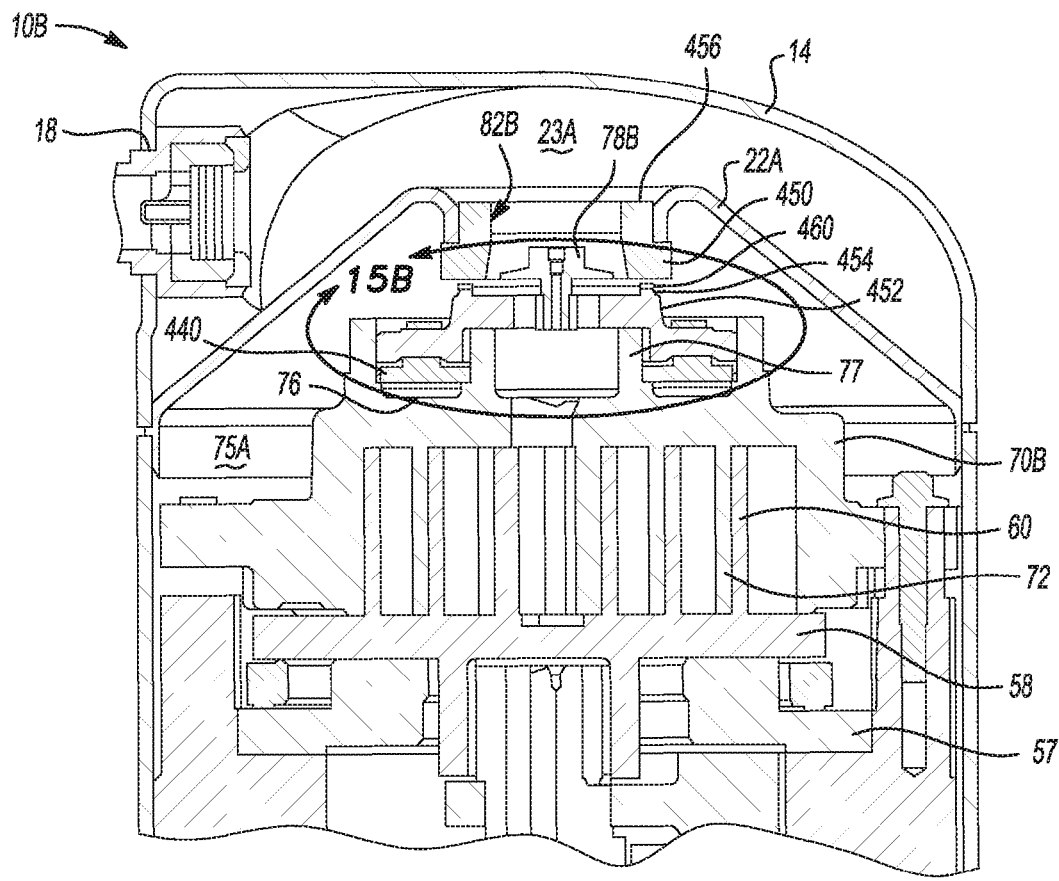
FIG. 15A is a detailed sectional view of a top portion of an alternative scroll compressor design prepared in accordance with certain principles of the present disclosure.
Figure 15B:
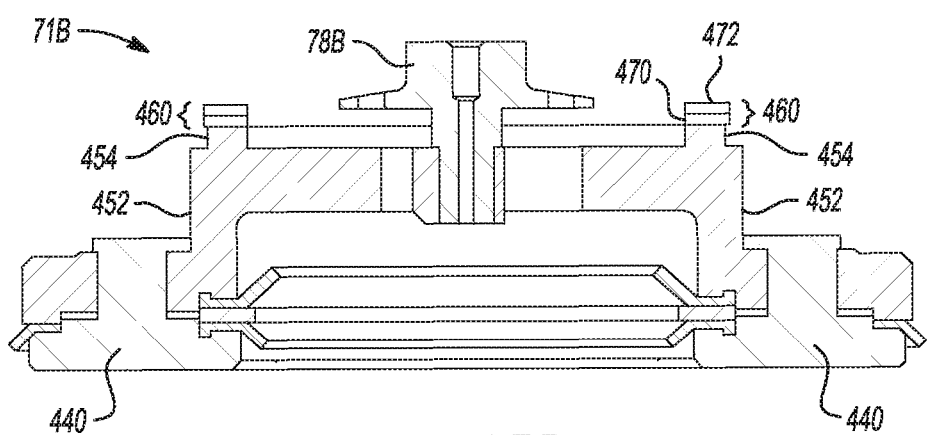
FIG. 15B is a detailed view of the sectional area shown in FIG. 15A showing a floating seal assembly and an upper seal plate prepared in accordance with certain principles of the present disclosure.
Figure 16:
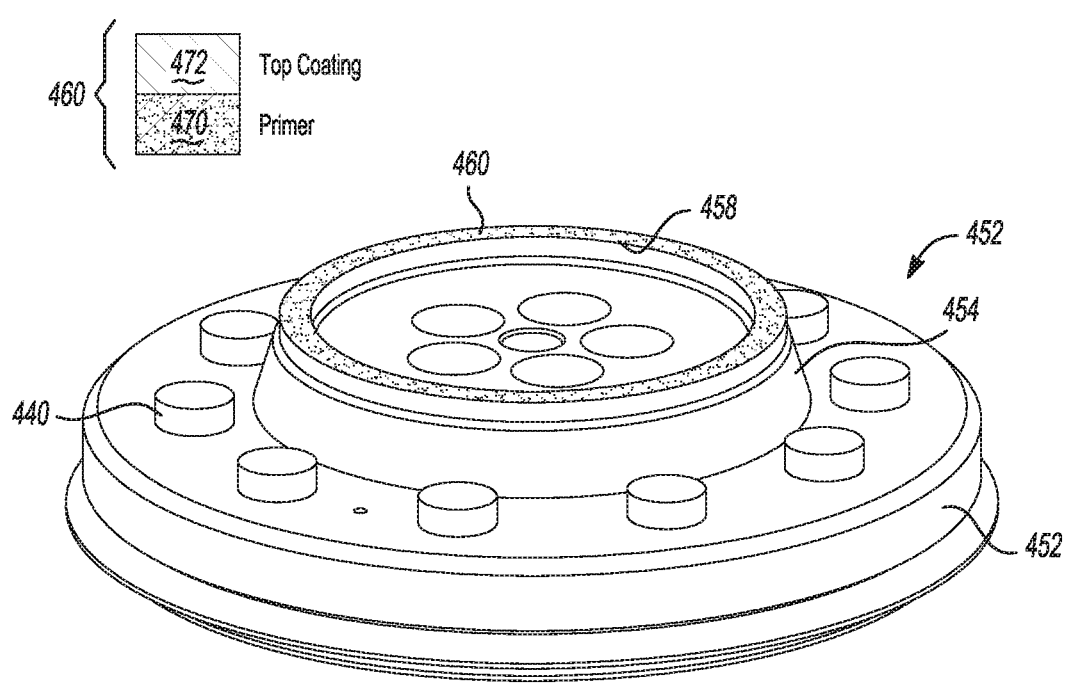
FIG. 16 is a perspective view of an upper seal plate of a floating seal assembly like that shown in FIGS. 15A-15B.

Certain aspects of the present teachings are reflected in another alternative embodiment shown in FIGS. 15A, 15B, and 16, which show a scroll compressor 10B having an embodiment of an inventive floating seal assembly prepared in accordance with certain aspects of the present teachings (as compared to a conventional floating seal assembly 71 shown in FIG. 1). To the extent that the scroll compressor 10B shares features with scroll compressor 10 in FIG. 1, these features will not be reintroduced or discussed here. Non-orbiting scroll 70B includes an annular hub or raised shoulder portion 77 which surrounds the discharge passage 74. The annular recess 76 is also formed in non-orbiting scroll 70B within which is disposed a floating seal assembly 71B.

An intake compartment 75B is in fluid communication with compressor inlet (not shown) through which the fluids (e.g., refrigerant) to be compressed into the intermeshed spiral vanes 60, 72 pockets. After the fluid is compressed in the spiral vanes 60, 72, it is then released through the discharge passage 74. A reed valve assembly 78B or other known valve assembly is provided in the discharge passage 74 to regulate flow from the discharge passage 74 through opening 82B and into discharge chamber 23B. The design and configuration of the partition 22B forms a tapered conical shape in relation to the cap 14, which is distinct from the design in FIG. 1. Thus, the discharge muffler chamber 23B is in fluid communication with discharge 18.

The floating seal assembly 71B includes a floating annular seal 440 and an upper seal plate 452. Upper seal plate 452 includes an upwardly projecting sealing lip or annular rim 454 which engages an insert 456 fitted into opening 82B in partition 22B to separate the discharge area of scroll compressor 10B (e.g., discharge chamber 23B) from the suction area of scroll compressor 10B (e.g., intake compartment 75B). The insert 456 can serve as a wear ring attached to partition 22B and seals against the sealing annular rim 454 of the upper seal plate 452. In lieu of a wear ring or insert 456, the lower surface of partition 22B can be locally hardened by nitriding, carbo-nitriding or other hardening processes known in the art. The floating annular seal 440 is supported by annular recess 76 of non-orbiting scroll 70B. As shown in FIG. 15B, floating annular seal 440 can be seated in a plurality of apertures 442 formed in the upper seal plate 452. Thus, the floating annular seal 440 can extend through the apertures 442 from a first side 444 to a second side 446 of lateral portions of the upper seal plate 452.

In accordance with certain aspects of the present teachings, as shown in FIG. 16, an annular upper seal plate wear surface 458 is defined on a terminal face of the projecting sealing annular rim 454 on the upper seal plate 452. The annular upper seal plate wear surface 458 contacts an opposing surface on insert 456 when assembled in scroll compressor 10B. A thirteenth anti-wear coating 460 can be disposed on the upper seal plate wear surface 458 is defined on a terminal face of the projecting sealing annular rim 454 on the upper seal plate 452.

In the embodiment shown in FIGS. 15A-15B and 16, the thirteenth anti-wear coating 460 optionally comprises a primer layer 470 disposed on and adjacent to the upper seal plate wear surface 458. The upper seal plate 452 may be formed from a metal, such cast iron, powdered metal (like an iron containing powder metal), aluminum, or other materials, such as partially formed of a plastic, which can meet performance requirements. Any of the wear surfaces described here may be pre-treated by blasting to enhance surface roughness, as discussed previously above.

As discussed above, in certain variations, the primer layer 470 optionally comprises a polyamide-imide (PAI) polymer material applied (e.g., applied once in a spraying process, followed by baking). Such a primer layer 470 is applied as a relatively thin layer, for example, having a thickness of about 0.0005 inches (about 12.7 μm). One of more layers of anti-wear top coating 472 can be applied over the primer layer 470. By way of example, two distinct layers may be applied by first spraying and then applying heat (e.g., baking) between applications of sprayed precursors. Such layers may have a total thickness of greater than or equal to about 0.002 inches (about 51 μm) to less than or equal to about 0.003 inches (about 76 μm). In one embodiment, a suitable anti-wear top coating 472 may comprise a polyetheretherketone (PEEK) with about 19 weight % polytetrafluoroethylene (PTFE) and about 11 weight % molybdenum disulfide ($MoS_2$).

Like any of the other anti-wear coatings, the thirteenth anti-wear coating 460 may optionally be lapped (polished) after both the primer layer 470 and the anti-wear top coating 472 are applied to the upper seal plate wear surface 458. Such a lapping process generally makes the surface flatter and reduces surface roughness, which maybe particularly desirable in certain applications for a face seal (that forms intimate contact with an opposing surface to achieve fluid sealing).

As noted above, in various aspects, the lower bearing assembly 38 includes the lower bearing 39 comprising a self-lubricating bearing material. The main bearing member 37 and/or the upper bearing 35 within the cylindrical hub 61 of orbiting scroll 58 may also optionally include such self-lubricating bearing materials. Such a material must fulfill certain performance criteria while avoiding degradation by exposure to various refrigerants. Certain refrigerants may behave as an organic solvent and/or corrosion agent and may potentially permeate into a material and cause physical or chemical alterations. Thus, in accordance with the present disclosure, it is desirable to provide a self-lubricating bearing material that is stable upon exposure to refrigerant throughout compressor operating conditions. Hermetic compressors, in particular, require bearing materials having long service life and superior long-term wear resistance; as such materials generally cannot be replaced via maintenance.

Thus, in various aspects, one or more wear surfaces (or portions of the scroll component that contact other components in the scroll compressor) comprise a metal material. The materials of the scroll component having the wear surface may comprise a metal material, such as iron alloys like grey iron, stainless steel, aluminum, or aluminum alloys. The scroll component may be wrought, cast, or sintered from a powdered metal in a conventional manner as recognized in the art. After the anti-wear material is applied to the scroll component wear surfaces, for example, by any of the techniques previously described above, it provides an anti-wear coating that serves as anti-wear surface, such as a bearing surface. The anti-wear coating formed in accordance with various aspects of the present teachings provides suitable abrasion resistance, high wear resistance and lubricity, as well as strength and robustness to withstand various operating conditions in the scroll compressor.

The present anti-wear coating is particularly suitable for wear surfaces of a scroll compressor, including bearing surfaces. In certain aspects, the present teachings contemplate using the thin anti-wear coating on a wear or bearing surface in a scroll compressor in lieu of a typical conventional sleeve bearing. In certain variations, the scroll compressor component having a wear surface that is coated with an anti-wear coating is optionally selected from the group consisting of: a drive flat on a crankshaft, a main journal bearing on a crankshaft, a lower journal bearing on a crankshaft, a slider block or a drive flat on a bushing, an outer diameter of a bushing, an Oldham coupling, an upper seal plate of a seal assembly, a face seal, a thrust plate, an orbiting scroll, a non-orbiting scroll, a thrust bearing surface on a main bearing housing, a lower bearing plate assembly, an Oldham sliding area on a main bearing housing, and combinations thereof.

In certain particularly desirable variations, the scroll compressor component having a wear surface that is coated with an anti-wear coating is selected from the group consisting of: a drive flat on a crankshaft, a main journal bearing on a crankshaft, a lower journal bearing on a crankshaft, a lower bearing plate assembly, an upper seal plate of a seal assembly, a face seal, a thrust plate, an orbiting scroll, a non-orbiting scroll, a thrust bearing surface on a main bearing housing, and combinations thereof. In certain variations, the scroll compressor component having a wear surface is a face seal that is coated with an anti-wear coating. Scroll compressors incorporating such scroll components with the inventive low coefficient of friction anti-wear coatings are robust, have very good lubricity, are lead-free and more environmentally-friendly, and can have tighter tolerances and thus improved anti-wear and anti-galling performance, especially for certain scroll compressor operating conditions and designs, like those that experience slow speeds and high load operating conditions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A scroll compressor component comprising:
an anti-wear coating disposed directly on at least a portion of a metal wear surface of the compressor component, the anti-wear coating having a thickness of less than or equal to about 0.005 inches (about 127 μm), wherein the anti-wear coating comprises a thermoplastic polymer, a first lubricant particle comprising molybdenum disulfide ($MoS_2$), and a second lubricant particle comprising polytetrafluoroethylene (PTFE), and wherein the scroll compressor component is selected from the group consisting of: a face seal, a drive flat on a crankshaft, a main journal bearing on a crankshaft, a lower journal bearing on a crankshaft, a slider block, a drive flat on a bushing, an outer diameter of a bushing, an Oldham coupling, an upper seal plate of a seal assembly, a thrust plate, an orbiting scroll, a non-orbiting scroll, a thrust bearing surface on a main bearing housing, a lower bearing plate assembly, an Oldham sliding area on a main bearing housing, and combinations thereof.

2. The compressor component of claim 1, wherein the thermoplastic polymer is a polyaryletherketone (PAEK) polymer selected from the group consisting of: polyetherketone (PEK), polyetheretherketone (PEEK), polyetheretheretherketone (PEEEK), polyetherketoneketone (PEKK), polyetheretherketoneketone (PEEKK), polyetherketoneetheretherketone (PEKEEK), polyetheretherketoneetherketone (PEEKEK), and combinations thereof.

3. The compressor component of claim 1, wherein the thickness of the anti-wear coating is greater than or equal to about 0.002 inches (about 51 μm) to less than or equal to about 0.003 inches (about 76 μm).

4. The compressor component of claim 1, wherein the anti-wear coating consists essentially of the thermoplastic polymer comprising polyetheretherketone (PEEK), the first lubricant particle comprising molybdenum disulfide (MoS$_2$), and the second lubricant particle comprising polytetrafluoroethylene (PTFE).

5. The compressor component of claim 1, wherein the anti-wear coating comprises the first lubricant particle comprising molybdenum disulfide (MoS$_2$) at greater than or equal to about 2.5% to less than or equal to about 25% by mass of the anti-wear coating; the second lubricant particle comprising polytetrafluoroethylene (PTFE) at greater than or equal to about 5% to less than or equal to about 30% by mass of the anti-wear coating; and the thermoplastic polymer at greater than or equal to about 45% to less than or equal to about 92.5% by mass of the anti-wear coating.

6. A scroll compressor component comprising:
a metal surface of the scroll compressor component defining a wear surface that comprises an anti-wear coating disposed directly thereon having a thickness of less than or equal to about 0.005 inches (about 127 µm), wherein the anti-wear coating consists essentially of (i) a thermoplastic polymer selected from the group consisting of: a polyetheretherketone (PEEK), polyaryletherketone (PAEK), a polyetheretheretherketone (PEEEK), and combinations thereof; (ii) a first lubricant particle comprising molybdenum disulfide (MoS$_2$); and (iii) a second lubricant particle comprising polytetrafluoroethylene (PTFE), wherein the scroll compressor component is selected from the group consisting of: a face seal, a drive flat on a crankshaft, a main journal bearing on a crankshaft, a lower journal bearing on a crankshaft, a slider block, a drive flat on a bushing, an outer diameter of a bushing, an Oldham coupling, an upper seal plate of a seal assembly, a thrust plate, an orbiting scroll, a non-orbiting scroll, a thrust bearing surface on a main bearing housing, a lower bearing plate assembly, an Oldham sliding area on a main bearing housing, and combinations thereof.

7. The scroll compressor component of claim 6, wherein the anti-wear coating consists essentially of the thermoplastic polymer comprising polyetheretherketone (PEEK), the first lubricant particle comprising molybdenum disulfide (MoS$_2$), and the second distinct lubricant particle comprising polytetrafluoroethylene (PTFE).

8. The scroll compressor component of claim 6, wherein the anti-wear coating comprises the first lubricant particle comprising molybdenum disulfide (MoS$_2$) at greater than or equal to about 2.5% to less than or equal to about 25% by mass of the anti-wear coating; the second lubricant particle comprising polytetrafluoroethylene (PTFE) at greater than or equal to about 5% to less than or equal to about 30% by mass of the anti-wear coating; and the thermoplastic polymer at greater than or equal to about 45% to less than or equal to about 92.5% by mass of the anti-wear coating.

\* \* \* \* \*